United States Patent
Fang et al.

(10) Patent No.: US 11,985,090 B2
(45) Date of Patent: May 14, 2024

(54) INFORMATION INDICATION METHOD AND APPARATUS, TERMINAL, BASE STATION AND STORAGE MEDIUM

(71) Applicant: ZTE CORPORATION, Shenzhen (CN)

(72) Inventors: Huiying Fang, Shenzhen (CN); Bo Dai, Shenzhen (CN); Xiubin Sha, Shenzhen (CN); Weiwei Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 160 days.

(21) Appl. No.: 17/629,330

(22) PCT Filed: May 9, 2020

(86) PCT No.: PCT/CN2020/089335
§ 371 (c)(1),
(2) Date: Jan. 21, 2022

(87) PCT Pub. No.: WO2021/012749
PCT Pub. Date: Jan. 28, 2021

(65) Prior Publication Data
US 2022/0329381 A1    Oct. 13, 2022

(30) Foreign Application Priority Data
Jul. 24, 2019   (CN) .......................... 201910675207.1

(51) Int. Cl.
*H04L 5/00* (2006.01)
*H04W 56/00* (2009.01)

(52) U.S. Cl.
CPC ....... *H04L 5/0051* (2013.01); *H04W 56/0015* (2013.01)

(58) Field of Classification Search
CPC ............ H04W 56/001; H04W 56/0015; H04J 11/0073; H04L 5/0048; H04L 5/0051
See application file for complete search history.

(56) References Cited

U.S. PATENT DOCUMENTS

| | | | |
|---|---|---|---|
| 2018/0279145 | A1 | 9/2018 | Jung et al. |
| 2019/0229973 | A1* | 7/2019 | Sengupta ............. H04J 11/0076 |

(Continued)

FOREIGN PATENT DOCUMENTS

| | | |
|---|---|---|
| CN | 111092702 A | 5/2020 |
| WO | WO2017121237 A1 | 7/2017 |
| WO | WO-2020200549 A1 | 10/2020 |

OTHER PUBLICATIONS

Ericsson, "Use of RSS for measurement improvements in LTE-MTC", *3GPP TSG-RAN WG1 Meeting #96bis R1-1903890*, Apr. 12, 2019 (Apr. 12, 2019), sections 2-3.

(Continued)

*Primary Examiner* — Yee F Lam
(74) *Attorney, Agent, or Firm* — Morgan, Lewis & Bockius LLP

(57) ABSTRACT

Provided are an information indication method and apparatus, a terminal, a base station and a storage medium. The information indication method includes described below, first information is sent to a terminal, where the first information includes a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the (Continued)

neighboring cell is the same as the RSS configuration information of the serving cell.

15 Claims, 8 Drawing Sheets

(56) References Cited

U.S. PATENT DOCUMENTS

| | | | | |
|---|---|---|---|---|
| 2019/0268904 A1* | 8/2019 | Miao | ............... | H04W 52/02 |
| 2019/0306812 A1* | 10/2019 | Sengupta | ............... | H04L 5/005 |
| 2020/0267670 A1* | 8/2020 | Åström | ............... | H04W 48/10 |
| 2021/0306049 A1* | 9/2021 | Kim | ............... | H04L 5/0048 |
| 2022/0132446 A1* | 4/2022 | Astrom | ............... | H04L 5/0094 |
| 2023/0026845 A1* | 1/2023 | Wong | ............... | H04W 56/0015 |

OTHER PUBLICATIONS

International Search Report for Application No. PCT/CN2020/089335, dated Aug. 10, 2020, 6 pages including English translation.

LG Electronics, "Discussion on the use of RSS for measurement improvement", *3GPP TSG RAN WG1 Meeting #97 R1-1906689*, May 17, 2019 (May 17, 2019), section 1.

Qualcomm Inc., "Measurements based on RSS", *3GPP TSG RAN WG1 Meeting #97 R1-1906999*, May 17, 2019 (May 17, 2019), sections 2-3.

Sony, "Summary of the use of RSS for measurement improvements", *3GPP TSG RAN WG1 #96bis R1-1905459*, Apr. 10, 2019 (Apr. 10, 2019), sections 1-3.

Extended European Search Report for U.S. Appl. No. 20/844,570, dated Jun. 23, 2023, 13 pages.

Huawei et al., "Use of RSS for measurement improvements", *3GPP TSG-RAN WG2 Meeting #106 R2-1907032*, May 13, 2019 (May 13, 2019), sections 1-3.

Ericsson, "Use of RSS for measurement improvements in LTE-MTC", *3GPP TSG-RAN WG1 Meeting #97 R1-1905964*, May 13, 2019 (May 13, 2019), sections 1-3.

Office Action for Chinese Application No. 201910675207.1, dated Nov. 8, 2023, 8 pages including translation.

Search Report for Chinese Application No. 201910675207.1, dated Nov. 8, 2023, 6 pages including translation.

* cited by examiner

Send first information to a terminal, where the first information includes a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell ⟶ 110

FIG. 1

PRB

| | |
|---|---|
| x | RSS |
| x+1 | |
| x+2 | |
| x+3 | RSS |
| x+4 | |
| x+5 | |
| x+6 | RSS |
| x+7 | |
| x+8 | |
| x+9 | |
| x+10 | RSS |
| x+11 | |

FIG. 2

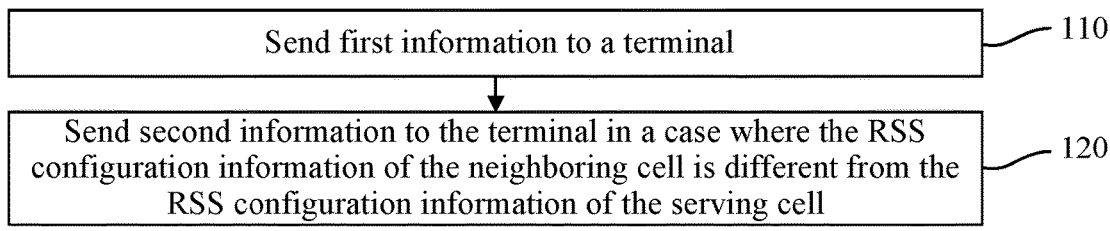

```
┌─────────────────────────────────────────────────────────────┐
│ Calculate a position within a group according to the cell   │─ 1210
│ identifier of the neighboring cell                          │
└─────────────────────────────────────────────────────────────┘
                              │
                              ▼
┌─────────────────────────────────────────────────────────────┐
│ Acquire an RSS time domain offset of the neighboring cell   │─ 1220
│ from a time domain offset group according to the position   │
│ within the group                                            │
└─────────────────────────────────────────────────────────────┘
```

FIG. 12

```
┌─────────────────────────────────────────────────────────────┐
│ Acquire a primary relative time domain offset of the RSS of │
│ the neighboring cell in the time domain offset group        │─ 1310
│ according to the position within the group indication       │
│ included in the second information from the neighboring cell│
└─────────────────────────────────────────────────────────────┘
                              │
                              ▼
┌─────────────────────────────────────────────────────────────┐
│ Calculate a secondary relative time domain offset according │─ 1320
│ to the cell identifier of the neighboring cell              │
└─────────────────────────────────────────────────────────────┘
                              │
                              ▼
┌─────────────────────────────────────────────────────────────┐
│ Acquire the RSS time domain offset of the neighboring cell  │
│ in the time domain offset group according to the primary    │─ 1330
│ relative time domain offset and the secondary relative time │
│ domain offset                                               │
└─────────────────────────────────────────────────────────────┘
```

```
┌─────────────────────────────────────────────────────────────┐
│ Calculate a relative time domain offset according to the    │─ 1410
│ cell identification of the neighboring cell                 │
└─────────────────────────────────────────────────────────────┘
                              │
                              ▼
┌─────────────────────────────────────────────────────────────┐
│ Acquire the RSS time domain offset of the neighboring cell  │─ 1420
│ from an RSS time domain offset interval according to the    │
│ relative time domain offset                                 │
└─────────────────────────────────────────────────────────────┘
```

FIG. 14

```
┌─────────────────────────────────────────────────────────────┐
│ Receive RSS configuration information of a serving cell     │─ 1510
│ from a base station                                         │
└─────────────────────────────────────────────────────────────┘
                              │
                              ▼
┌─────────────────────────────────────────────────────────────┐
│ Determine RSS configuration information of a neighboring    │─ 1520
│ cell according to the RSS configuration information of the  │
│ serving cell                                                │
└─────────────────────────────────────────────────────────────┘
```

FIG. 15

INFORMATION INDICATION METHOD AND APPARATUS, TERMINAL, BASE STATION AND STORAGE MEDIUM

CROSS-REFERENCE TO RELATED APPLICATIONS

This is a National Stage Application filed under 35 U.S.C. 371 based on International Patent Application No. PCT/CN2020/089335, filed on May 9, 2020, which claims priority to Chinese Patent Application No. 201910675207.1 filed on Jul. 24, 2019, the disclosures of both of which are incorporated herein by reference in their entireties.

TECHNICAL FIELD

The present application relates to a wireless communication network and, for example, to an information indication method and apparatus, a terminal, a base station and a storage medium.

BACKGROUND

Machine type communications (MTCs) are one of application forms of the Internet of Things at the present stage. In order to realize the measurement of the reference signal received power (RSRP) or the reference signal received quality (RSRQ) of each neighboring cell, an idle MTC terminal needs to obtain configuration information of a re-synchronization signal (RSS) of each neighboring cell in advance, and the configuration information includes an RSS frequency domain position, an RSS time domain offset and a number of cell-specific reference signal (CRS) ports. In a base station system, an RSS frequency domain position of a current serving cell of a terminal needs to be indicated through 7 bits, and an RSS time domain offset of the current serving cell is indicated through 5 bits. If the complete RSS frequency domain position, RSS time domain offset information and information of a number of CRS ports of each neighboring cell are required to be indicated, the overhead of the signaling indication is very large.

SUMMARY

This application provides an information indication method and apparatus, a terminal, a base station and a storage medium.

An embodiment of the present application provides an information indication method. The information indication method includes the following, first information is send to a terminal, where the first information includes a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell.

An embodiment of the present application provides an information indication method. The information indication method includes the following, first information is received from a base station, where the first information includes a re-synchronization signal (RSS) configuration indication, and the RSS configuration indication is used for indicating whether RSS configuration information of a neighboring cell is the same as RSS configuration information of a serving cell; and the RSS configuration information of the neighboring cell is acquired according to the RSS configuration information of the serving cell in a case where the RSS configuration information of the neighboring cell is the same as the RSS configuration information of the serving cell.

An embodiment of the present application provides an information indication method. The information indication method includes the following, RSS configuration information of a serving cell is received from a base station; and RSS configuration information of a neighboring cell is determined according to the RSS configuration information of the serving cell.

An embodiment of the present application provides a base station. The base station includes a first sending module. The first sending module is configured to send first information to a terminal, where the first information includes a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell.

An embodiment of the present application provides a terminal. The terminal includes a first receiving module and a first acquisition apparatus. The first receiving module is configured to receive first information from a base station, where the first information includes a re-synchronization signal (RSS) configuration indication, and the RSS configuration indication is used for indicating whether RSS configuration information of a neighboring cell is the same as RSS configuration information of a serving cell. The first acquisition apparatus is configured to acquire the RSS configuration information of the neighboring cell according to the RSS configuration information of the serving cell in a case where the RSS configuration information of the neighboring cell is the same as the RSS configuration information of the serving cell.

An embodiment of the present application provides a terminal. The terminal includes a first receiving module and a first determination apparatus. The first receiving module is configured to receive RSS configuration information of a serving cell from a base station. The first determination apparatus is configured to determine RSS configuration information of a neighboring cell according to the RSS configuration information of the serving cell.

An embodiment of the present application provides a non-transitory storage medium. The storage medium stores a computer program, where the computer program, when executed by a processor, implements any one of the methods of the embodiments of the present application.

BRIEF DESCRIPTION OF DRAWINGS

FIG. 1 is a flowchart of an information indication method provided in an embodiment of the present disclosure;

FIG. 2 is a schematic diagram of an RSS frequency domain position in an embodiment of the present disclosure;

FIG. 3 is a flowchart of an information indication method provided in an embodiment of the present disclosure;

FIG. 12 is a flowchart of an information indication method provided in an embodiment of the present disclosure;

FIG. 13 is a flowchart of an information indication method provided in an embodiment of the present disclosure;

FIG. 14 is a flowchart of an information indication method provided in an embodiment of the present disclosure;

FIG. 15 is a flowchart of an information indication method provided in an embodiment of the present disclosure;

DETAILED DESCRIPTION

Figure 4:
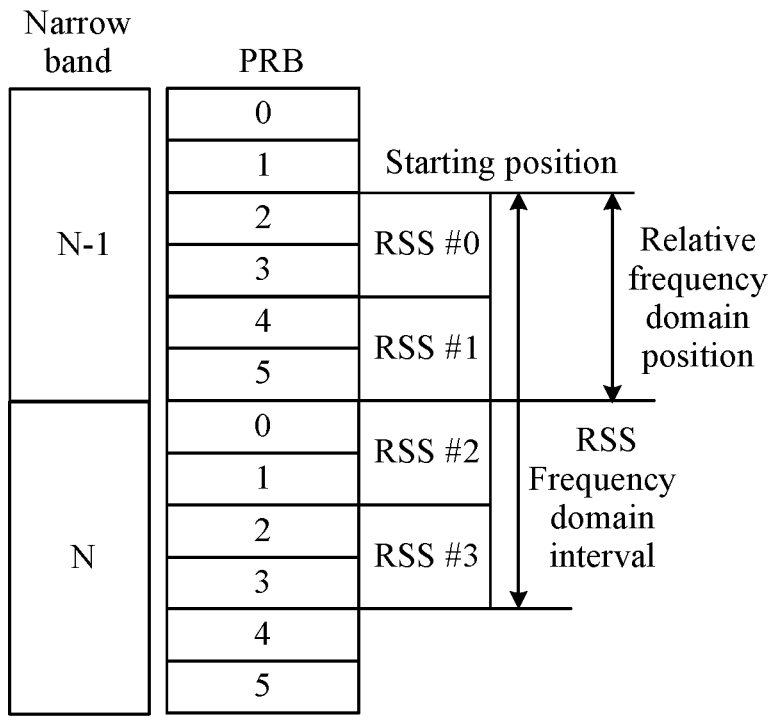
FIG. 4 is a schematic diagram of a position of an RSS frequency domain position in an RSS frequency domain interval.

Hereinafter, embodiments of the present application will be described in detail in conjunction with the accompanying drawings. It should be noted that, in the present application, the embodiments and the features of the embodiments may be arbitrarily combined with each other without conflict.

An embodiment of the present disclosure provides an information indication method, and FIG. 1 is a flowchart of an information indication method provided in an embodiment of the present disclosure. In one example implementation, the information indication method includes described below.

In 110, first information is sent to a terminal, where the first information includes a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell.

The serving cell may be a cell where the terminal is located. The terminal may include various types of user equipment, such as a mobile phone, a portable data processing device, a portable web browser, or a vehicle-mounted mobile station. The information indication method described above may be performed by a base station.

The RSS configuration information may include one or more of an RSS frequency domain position, an RSS time domain offset, and a number of cell-specific reference signal (CRS) ports. FIG. 2 is a schematic diagram of the RSS frequency domain position, a re-synchronization signal (RSS) occupies two physical resource blocks (PRBs) in a frequency domain. For example, one RSS occupies a x-th PRB and a (x+1)-th PRB in a frequency domain interval with a starting position of x and occupying 12 PRBs. For example, the RSS frequency domain position may be indicated by indicating a starting PRB position of the RSS. AN RSS time domain position may also be indicated by an offset value indicating the RSS relative to a time domain starting position. The number of CRS ports may be 1, 2, or 4, and the like.

According to the embodiments of the present disclosure, whether the RSS configuration information of the neighboring cell is the same as the RSS configuration information of the serving cell is indicated through the RSS configuration indication in the first information. If the same, then the terminal may acquire the RSS configuration information of the neighboring cell according to the RSS configuration information of the serving cell. Therefore, the base station does not need to send RSS configuration information of each neighboring cell to the terminal, and the overhead of the information indication is greatly reduced.

In specific implementation, for example, the base station may indicate whether RSS configuration information of all neighboring cells is the same as the RSS configuration information of the serving cell at one time. The base station may also respectively indicate whether the RSS configuration information of the neighboring cells is the same as the RSS configuration information of the serving cell for different neighboring cells. The base station may also indicate whether the RSS configuration information of the all neighboring cells is the same as the RSS configuration information of the serving cell at one time, and then respectively indicate whether the RSS configuration information of each neighboring cell is the same as the RSS configuration information of the serving cell.

For example, the RSS configuration indication is used for indicating whether the RSS configuration information of the all neighboring cells is the same as the RSS configuration information of the serving cell.

For example, the RSS configuration indication is used for indicating whether the RSS configuration information of each neighboring cell is the same as the RSS configuration information of the serving cell.

For example, the base station may also indicate whether various RSS configuration information of the neighboring cell and various RSS configuration information of the serving cell are all the same at one time. The base station may also respectively indicate whether various RSS configuration information of the neighboring cell is the same as various RSS configuration information of the serving cell for different RSS configuration information, for example, the base station may respectively indicate whether an RSS frequency domain position of the neighboring cell is the same as an RSS frequency domain position of the serving cell and whether an RSS time domain offset of the neighboring cell is the same as an RSS time domain offset of the serving cell.

For example, the RSS configuration information of the neighboring cell being the same as the RSS configuration information of the serving cell includes at least one of: an RSS frequency domain position of the neighboring cell is the same as an RSS frequency domain position of the serving cell; an RSS time domain offset of the neighboring cell is the same as an RSS time domain offset of the serving cell; or a number of cell-specific reference signal (CRS) ports of the neighboring cell is the same as a number of CRS ports of the serving cell.

The embodiments of the present disclosure include various implementation modes for indicating whether the RSS configuration information of the neighboring cell is the same as the RSS configuration information of the serving cell in different stages, different regions and different information types.

FIG. 3 is a flowchart of an information indication method provided in an embodiment of the present disclosure, and as shown in FIG. 3, the information indication method provided in an embodiment of the present disclosure may further include the following.

In 110, first information is sent to a terminal, where the first information includes a re-synchronization signal (RSS) configuration indication, the RSS configuration indication is used for indicating whether RSS configuration information of a neighboring cell is the same as RSS configuration information of a serving cell, so that the first information is used for indicating that the terminal acquires the RSS configuration information of the neighboring cell according to the RSS configuration information of the serving cell in a case where the RSS configuration information of the neighboring cell is the same as the RSS configuration information of the serving cell.

In 120, second information is sent to the terminal in a case where the RSS configuration information of the neighboring cell is different from the RSS configuration information of the serving cell.

According to the embodiments of the present disclosure, in a case where the RSS configuration information of the neighboring cell is different from the RSS configuration information of the serving cell, the information indication may be realized by sending the second information. The flexibility of configuring the RSS is ensured, an RSS of each cell may be diversified, and meanwhile, the signaling overhead of the information indication is reduced.

For example, the second information may include RSS configuration information and may also include identification information of the RSS configuration information, so that the signaling overhead of the information indication is further reduced.

In an example implementation, the second information may include a frequency domain candidate position indication for indicating a position of an RSS of the neighboring cell in a frequency domain candidate position.

When an RSS frequency domain position is configured for each cell, the RSS frequency domain position of each cell may be configured in predefined RSS frequency domain candidate positions, such as, in P candidate positions. A frequency domain candidate position indication in the second information may be a position identifier of the RSS frequency domain position of the neighboring cell in the P candidate positions. The position identifier may, for example, be numberings of P candidate positions. Accordingly, the frequency domain candidate position indication may be $\log_2 P$ bits of information.

In an example implementation, the second information may include a relative frequency domain offset for indicating a position of the RSS of the neighboring cell in an RSS frequency domain interval.

When an RSS frequency domain position is configured for each cell, the RSS frequency domain position of each cell may be configured in a predefined RSS frequency domain interval. FIG. 4 is a schematic diagram of a position of an RSS frequency domain position in an RSS frequency domain interval, the RSS frequency domain position may be configured in a third PRB (a numbering of the PRB=2, since the numbering of the PRB is starting from 0) in a (N−1)-th narrow band to a fourth PRB in a N-th narrow band.

The relative frequency domain offset in the second information may indicate an offset value of the RSS frequency domain position of the neighboring cell relative to a certain reference position in the interval. The reference position may be a center position, a starting position or a preset position of the frequency domain interval. An offset value of the RSS frequency domain position of the neighboring cell relative to the reference position may be a forward offset value of the reference position and may also be a backward offset value of the reference position. FIG. 4 exemplarily uses the starting position of the interval as the reference position and uses the backward offset value of the reference position as the relative frequency domain position. If there are Q frequency domain relative offset values, the relative frequency domain position may be $\log_2 P$ bits of information.

In an example implementation, the second information may include an indication for a position within a narrow band for indicating a position of the RSS of the neighboring cell in a narrow band.

Figure 5:
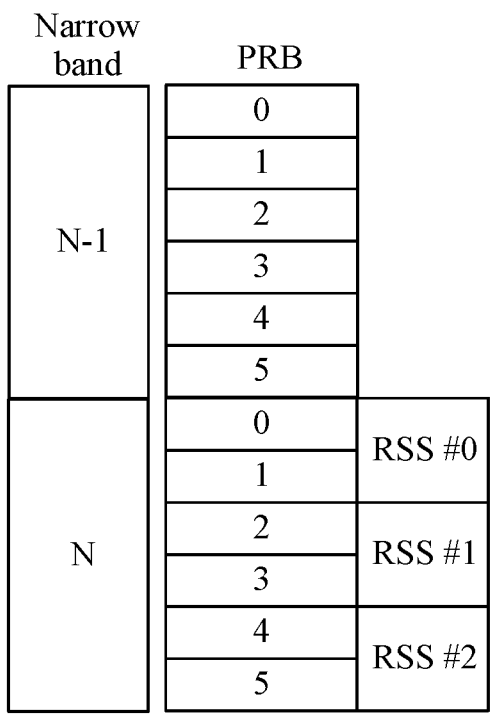
FIG. 5 is a schematic diagram of a frequency domain position of an RSS frequency domain position in a narrow band.

When an RSS frequency domain position is configured for each cell, an RSS frequency domain position of the serving cell and an RSS frequency domain position of the neighboring cell thereof may be configured in a same narrow band. FIG. 5 is a schematic diagram of a frequency domain position of an RSS frequency domain position in a narrow band, one narrow band has 6 PRBs, and a starting position of the RSS frequency domain position may be a first PRB (marked as "PRB #0"), a third PRB (marked as "PRB #2") or a fifth PRB (marked as "PRB #4") in the narrow band.

The indication for the position within the narrow band may indicate that the terminal acquires the RSS frequency domain position of the neighboring cell in the narrow band. For example, the terminal may determine a narrow band where the serving cell and the neighboring cell are located according to the RSS frequency domain position of the serving cell, and may determine a position of the RSS frequency domain position of the neighboring cell in the narrow band according to the indication for the position within the narrow band.

There are various example implementations of indication information of the indication for the position within the narrow band.

Example one: the indication for the position within the narrow band may indicate a position of a starting position of the RSS frequency domain position of the neighboring cell in the narrow band. For example, the indication for the position within the narrow band may be two bits of information representing three starting positions.

Example two: in a case where the RSS configuration indication respectively indicates whether the RSS frequency domain position of each neighboring cell is the same as the RSS frequency domain position of the serving cell, for a neighboring cell with an RSS frequency domain position different from the RSS frequency domain position of the serving cell, the indication for the position within the narrow band may use 1 bit of information. The indication for the position within the narrow band may indicate a position direction of the RSS frequency domain position of the neighboring cell relative to the RSS frequency domain position of the serving cell in the narrow band. For example, three positions of the RSS frequency domain in the narrow band form a cyclic order, and the indication for the position within the narrow band may use 1 bit of information, which represents that that the RSS frequency domain position of the neighboring cell is a preceding position or a following position of the RSS frequency domain position of the serving cell.

Example three: in a case where the RSS configuration indication respectively indicates whether the RSS frequency domain position of each neighboring cell is the same as the RSS frequency domain position of the serving cell, for a neighboring cell with an RSS frequency domain position different from the RSS frequency domain position of the serving cell, the indication for the position within the narrow band may use 1 bit of information. The indication for the position within the narrow band may indicate whether the RSS frequency domain position of the neighboring cell is a relatively high value or a relatively low value in two other frequency domain positions in the narrow band other than the RSS frequency domain position of the serving cell. For example, the RSS frequency domain position of the serving cell is "PRB #2", an indication for a position within a narrow band of 1 represents that the RSS frequency domain position of the neighboring cell is a relatively high value of "PRB #0" and "PRB #4", i.e., "PRB #4", and an indication for a position within a narrow band of 0 represents that the RSS frequency domain position of the neighboring cell is a relatively low value of "PRB #0" and "PRB #4", i.e., "PRB #0".

In the above example implementation, in a case where the RSS configuration information of the neighboring cell is different from the RSS configuration information of the serving cell, the RSS frequency domain position of the neighboring cell is indicated by the second information including the identification information, and thus the signaling overhead of the information indication is further reduced.

In an example implementation, the second information may include a time domain candidate position indication for indicating a position of an RSS of the neighboring cell in multiple RSS time domain offset candidate positions.

When an RSS time domain offset is configured for each cell, the RSS time domain offset for each cell may be configured in predefined RSS time domain offset candidate positions, such as, in L candidate positions. A time domain candidate position indication in the second information may be identification information of the RSS time domain offset of the neighboring cell in the L candidate positions. The identification information may, for example, be numberings of L candidate positions. Accordingly, the time domain candidate position indication may be $\log_2 P$ bits of information.

In an example implementation, the second information may include a relative time domain offset for indicating a position of the RSS of the neighboring cell in an RSS time domain offset interval.

When an RSS time domain offset is configured for each cell, the RSS time domain offset of each cell may be configured in a predefined RSS time domain offset interval. For example, the RSS time domain offset may be configured between a y-th time domain offset to a (y+N)-th time domain offset. A relative time domain offset in the second information may indicate an offset value of the RSS time domain offset of the neighboring cell relative to a certain reference position in the interval. The reference position may be a center position, a starting position or a preset position of the time domain offset interval. An offset value of the RSS time domain offset of the neighboring cell relative to the reference position may be a forward offset value of the reference position and may also be a backward offset value of the reference position. If there are S frequency domain relative offset values, the relative frequency domain position may be $\log_2 S$ bits of information.

In an example implementation, the second information may include an indication for a position within a narrow band for indicating a position of the RSS of the neighboring cell in a time domain offset group.

Figure 6:
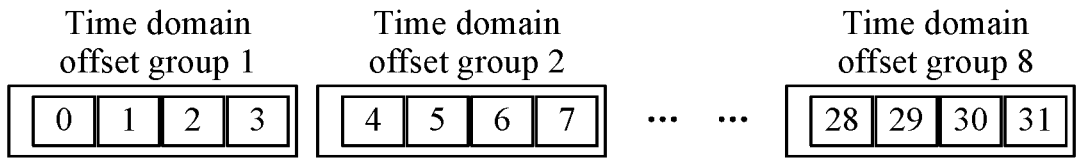
FIG. 6 is a schematic diagram of a time domain offset set.

When an RSS frequency domain position is configured for each cell, an RSS time domain offset of the serving cell and an RSS time domain offset of the neighboring cell thereof may be configured in a same time domain offset group. The time domain offset group may be a small group that divides multiple time domain offset values according to a predefined rule. Multiple RSS time domain offset candidate positions, such as, N RSS time domain offset positions, may be divided into H time domain offset groups, each time domain offset group includes M RSS time domain offset values, H=N/M. Referring to the schematic diagram of the time domain offset group shown in FIG. 6, FIG. 6 shows the division of the time domain offset group with N=32, M=4, H=8.

The position within the group indication may indicate that the terminal acquires the RSS time domain offset of the neighboring cell in the time domain offset group. For example, the terminal may determine a time domain offset group where the serving cell and the neighboring cell are located according to the RSS time domain offset of the serving cell, and may determine a position of the RSS time domain offset of the neighboring cell in the narrow band according to the position within the group indication.

There are various example implementations of indication information of the position within the group indication.

Example one: the position within the group indication may directly indicate a position of the RSS time domain offset of the neighboring cell in the time domain offset group. For example, when there are four time domain offset values in the time domain offset group, the position within the group indication may be two bits of information representing four starting positions.

Example two: the position within the group indication may indicate a position of the RSS time domain offset of the neighboring cell in the time domain offset group by indicating the offset value of the RSS time domain offset of the neighboring cell relative to a certain reference position in the time domain offset group. The reference position may be a center position, a starting position or a preset position of the time domain offset set. An offset value of the RSS time domain offset of the neighboring cell relative to the reference position may be a forward offset value of the reference position and may also be a backward offset value of the reference position. If there are K frequency domain relative offset values, the relative frequency domain position may be $\log_2 K$ bits of information.

In the above example implementation, in a case where the RSS configuration information of the neighboring cell is different from the RSS configuration information of the serving cell, the RSS time domain offset of the neighboring cell is indicated by the second information including the identification information, and thus the signaling overhead of the information indication is further reduced.

In an example implementation, the second information includes an indication of a number of CRS ports, and the indication of the number of CRS ports is used for indicating that the terminal acquires a number of CRS ports of the neighboring cell in multiple of a number of candidate ports.

For example, the indication of the number of CRS ports is used for indicating that a number of CRS ports of the neighboring cell is a relatively high value or a relatively low value of two of a number of candidate ports other than a number of CRS ports of the serving cell. The number of CRS ports may take a value of 1, 2, or 4. In a case where the RSS configuration indication included in the first information respectively indicates whether a number of CRS ports of each neighboring cell is the same as the number of CRS ports of the serving cell, for a neighboring cells with a number of CRS ports different from the number of CRS ports of the neighboring cell, the indication of the number of CRS ports may use 1 bit of information. The number of CRS ports may indicate that the number of CRS ports of the neighboring cell is the relatively high value or the relatively low value of the two of a number of candidate ports other than the number of CRS ports of the serving cell.

In the above example implementation, in a case where the RSS configuration information of the neighboring cell is different from the RSS configuration information of the serving cell, the number of CRS ports of the neighboring cell is indicated by the second information including the identification information, and thus the signaling overhead of the information indication is further reduced.

According to the information indication method provided in the embodiments of the present disclosure, whether the RSS configuration information of the neighboring cell is the same as the RSS configuration information of the serving cell is indicated through the first information, and the second information indication is performed in a case where the RSS configuration information of the neighboring cell is different from the RSS configuration information of the serving cell, so that the indication signaling overhead of the RSS configuration information may be reduced to a greater extent.

Figure 7:
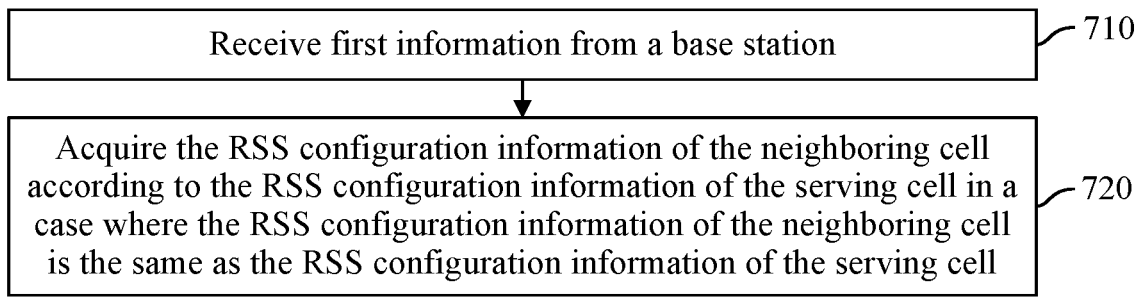
FIG. 7 is a flowchart of an information indication method provided in an embodiment of the present disclosure.

FIG. 7 is a flowchart of an information indication method provided in an embodiment of the present disclosure. As shown in FIG. 7, in one example implementation, the information indication method includes described below.

In 710, first information is received from a base station, where the first information includes a re-synchronization signal (RSS) configuration indication, and the RSS configuration indication is used for indicating whether RSS configuration information of a neighboring cell is the same as RSS configuration information of a serving cell.

In 720, the RSS configuration information of the neighboring cell is acquired according to the RSS configuration information of the serving cell in a case where the RSS configuration information of the neighboring cell is the same as the RSS configuration information of the serving cell.

The above information indicating method may be implemented by a terminal.

For example, the RSS configuration indication is used for indicating whether RSS configuration information of all neighboring cells is the same as the RSS configuration information of the serving cell.

For example, the RSS configuration indication is used for respectively indicating whether RSS configuration information of each neighboring cell is the same as the RSS configuration information of the serving cell.

Figure 8:
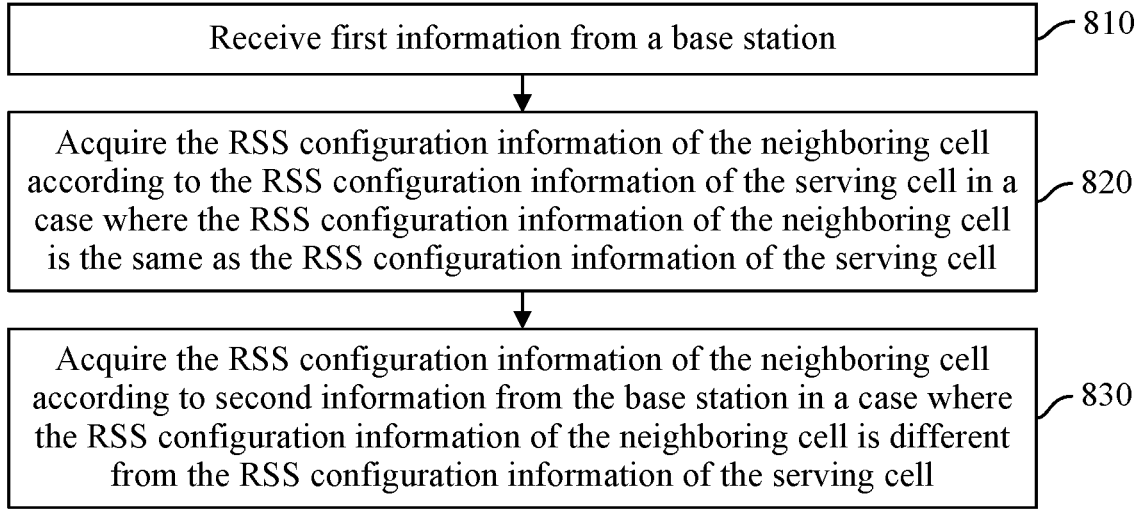
FIG. 8 is a flowchart of an information indication method provided in an embodiment of the present disclosure.

FIG. 8 is a flowchart of an information indication method provided in an embodiment of the present disclosure. The information indication method includes described below.

In 810, first information is received from a base station, where the first information includes a re-synchronization signal (RSS) configuration indication, and the RSS configuration indication is used for indicating whether RSS configuration information of a neighboring cell is the same as RSS configuration information of a serving cell.

In 820, the RSS configuration information of the neighboring cell is acquired according to the RSS configuration information of the serving cell in a case where the RSS configuration information of the neighboring cell is the same as the RSS configuration information of the serving cell.

In 830, the RSS configuration information of the neighboring cell is acquired according to second information from the base station in a case where the RSS configuration information of the neighboring cell is different from the RSS configuration information of the serving cell.

The information indication method executed by the terminal provided in the embodiments of the present disclosure may be correspondingly set by referring to the information indication method executed by the base station provided in the embodiments of the present disclosure, and has corresponding effects.

For example, the RSS configuration information of the neighboring cell being the same as the RSS configuration information of the serving cell includes at least one of: an RSS frequency domain position of the neighboring cell is the same as an RSS frequency domain position of the serving cell; an RSS time domain offset of the neighboring cell is the same as an RSS time domain offset of the serving cell; or a number of cell-specific reference signal (CRS) ports of the neighboring cell is the same as a number of CRS ports of the serving cell.

For example, the RSS configuration information of the neighboring cell being acquired according to the second information from the base station includes at least one of: an RSS frequency domain position of the neighboring cell is acquired from multiple RSS frequency domain candidate positions according to a frequency domain candidate position indication included in the second information; an RSS frequency domain position of the neighboring cell is acquired from an RSS frequency domain interval according to a relative frequency domain offset included in the second information; or an RSS frequency domain position of the neighboring cell is acquired from a narrow band according to an indication for a position within a narrow band included in the second information, where an RSS frequency domain position of the serving cell and the RSS frequency domain position of the neighboring cell are located in a same narrow band.

For example, that the RSS configuration information of the neighboring cell is acquired according to the second information from the base station includes at least one of: an RSS time domain offset of the neighboring cell is acquired from multiple RSS time domain offset candidate positions according to a time domain candidate position indication included in the second information; an RSS time domain offset of the neighboring cell is acquired from an RSS time domain offset interval according to a relative time domain offset included in the second information; or an RSS time domain offset of the neighboring cell is acquired from a time domain offset group according to an indication for a position within a group included in the second information, where an RSS time domain offset of the serving cell and the RSS time domain offset of the neighboring cell are located in a same time domain offset group. The multiple RSS time domain offset candidate positions include H time domain offset groups, and each time domain offset group includes M RSS time domain offset values.

For example, that the RSS configuration information of the neighboring cell is acquired according to the second information from the base station includes: a number of CRS ports of the neighboring cell is acquired according to an indication of a number of CRS ports included in the second information; where the indication of the number of CRS ports is used for indicating that the number of CRS ports of the neighboring cell is a relatively high value or a relatively low value of two of a number of candidate ports other than a number of CRS ports of the serving cell.

Figure 9:
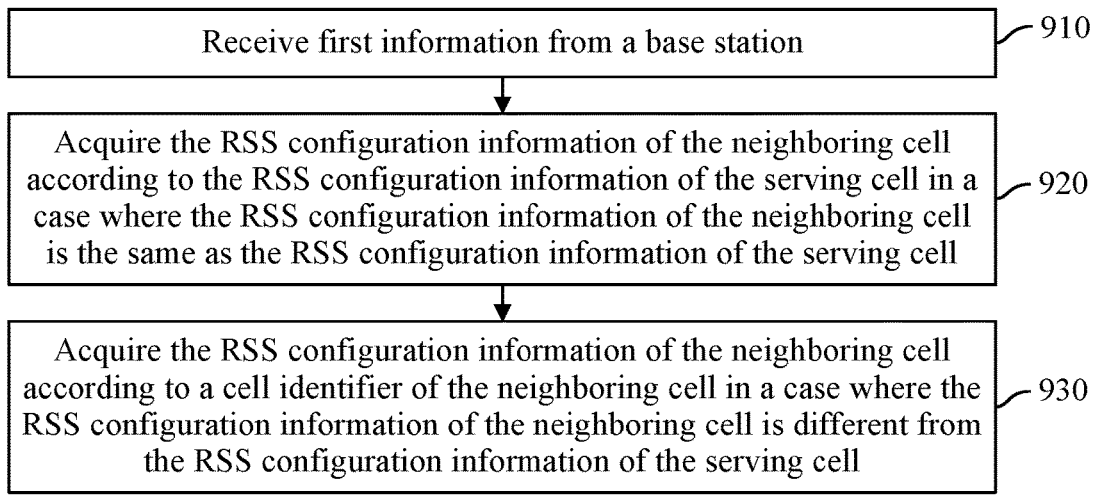
FIG. 9 is a flowchart of an information indication method provided in an embodiment of the present disclosure.

An embodiment of the present disclosure further provides another example information indication method, and FIG. 9 shows a flowchart of an information indication method provided in an embodiment of the present disclosure, the method includes described below.

In 910, first information is received from a base station, where the first information includes a re-synchronization signal (RSS) configuration indication, and the RSS configuration indication is used for indicating whether RSS configuration information of a neighboring cell is the same as RSS configuration information of a serving cell.

In 920, the RSS configuration information of the neighboring cell is acquired according to the RSS configuration information of the serving cell in a case where the RSS configuration information of the neighboring cell is the same as the RSS configuration information of the serving cell.

In 930, the RSS configuration information of the neighboring cell is acquired according to a cell identifier of the neighboring cell in a case where the RSS configuration information of the neighboring cell is different from the RSS configuration information of the serving cell.

According to the information indication method provided in the embodiments of the present disclosure, whether the RSS configuration information of the neighboring cell is the same as the RSS configuration information of the serving cell is indicated through the first information, and the RSS configuration information of the neighboring cell is acquired according to the cell identifier of the neighboring cell in a case where the RSS configuration information of the neighboring cell is different from the RSS configuration information of the serving cell, so that the indication signaling overhead of the RSS configuration information may be reduced to a greater extent.

Figure 10:
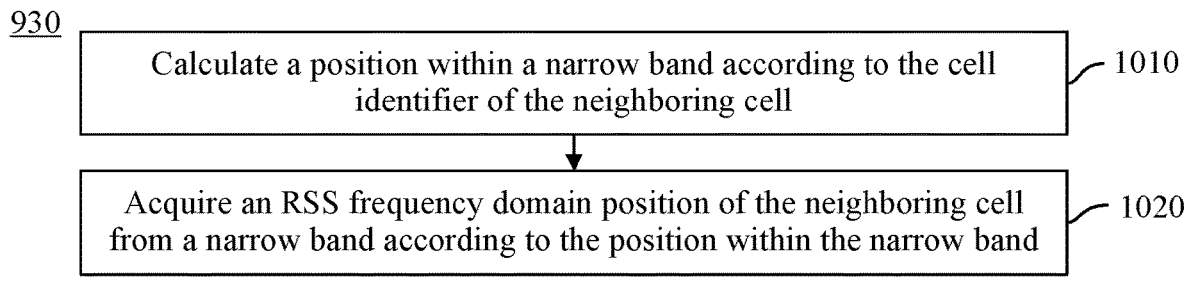
FIG. 10 is a flowchart of an information indication method provided in an embodiment of the present disclosure.

FIG. 10 is a flowchart of an information indication method provided in an embodiment of the present disclosure, in an example implementation, the above 930 in which the RSS configuration information of the neighboring cell is acquired according to the cell identifier of the neighboring cell includes described below.

In 1010, a position within a narrow band is calculated according to the cell identifier of the neighboring cell.

In 1020, an RSS frequency domain position of the neighboring cell is acquired from a narrow band according to the position within the narrow band, where an RSS frequency domain position of the serving cell and the RSS frequency domain position of the neighboring cell are located in a same narrow band.

For example, the above 1010 may include: a position within a narrow band number is moduloed by the cell identifier of the neighboring cell to obtain the position within the narrow band. The above 1020 may include: the RSS frequency domain position of the neighboring cell is acquired from a narrow band where the RSS frequency domain position of the neighboring cell is located according to the position within the narrow band. The position within the narrow band=CELL ID MOD 3 is defined, where CELL ID is the CELL identifier of the neighboring CELL, and 3 is the position within the narrow band number, so that a specific frequency domain position in the narrow band may be calculated and obtained conveniently.

Figure 11:
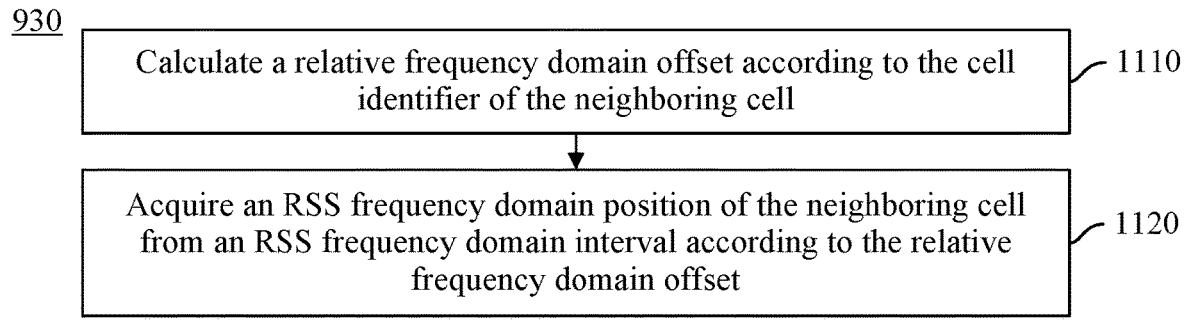
FIG. 11 is a flowchart of an information indication method provided in an embodiment of the present disclosure.

FIG. 11 is a flowchart of an information indication method provided in an embodiment of the present disclosure, in an example implementation, the above 930 in which the RSS configuration information of the neighboring cell is acquired according to the cell identifier of the neighboring cell includes described below.

In 1110, a relative frequency domain offset is calculated according to the cell identifier of the neighboring cell.

In 1120, an RSS frequency domain position of the neighboring cell is acquired from an RSS frequency domain interval according to the relative frequency domain offset.

When an RSS frequency domain position is configured for each cell, the RSS frequency domain position of each cell may be configured in a predefined RSS frequency domain interval, or the relative frequency domain offset of the neighboring cell (an offset value of the RSS frequency domain position of the neighboring cell relative to a certain reference position in the interval) may be defined to be obtained from the cell identifier.

For example, the above 1110 may include: a number of relative frequency domain offsets in the RSS frequency domain interval is moduloed by the cell identifier of the neighboring cell to obtain the relative frequency domain offset. The above 1120 may include: an RSS frequency domain position of the neighboring cell is acquired in the RSS frequency domain interval according to the relative frequency domain offset. The relative frequency domain offset=CELL ID mod Q is defined, the CELL ID is the cell identification of the neighboring cell, Q is the number of relative frequency domain offsets, so that the relative frequency domain offset may be calculated and obtained conveniently.

FIG. 12 is a flowchart of an information indication method provided in an embodiment of the present disclosure, the above 930 in which the RSS configuration information of the neighboring cell is acquired according to the cell identifier of the neighboring cell includes described below In 1210, a position within a group is calculated according to the cell identifier of the neighboring cell.

In 1220, an RSS time domain offset of the neighboring cell is acquired from a time domain offset group according to the position within the group.

When an RSS frequency domain position is configured for each cell, an RSS time domain offset of the serving cell and an RSS time domain offset of the neighboring cell may be configured in a same time domain offset group. The time domain offset group may be a small groups that divides multiple time domain offset values according to a predefined rule. Multiple RSS time domain offset candidate positions, such as, N RSS time domain offset candidate positions, may be divided into H time domain offset groups, each time domain offset group includes M RSS time domain offset values, H=N/M. The position within the group is a position sequence number of the RSS frequency domain in the time domain offset group, and the position within the group of the RSS time domain offset of the neighboring cell may be defined and calculated by the cell identifier. The terminal may determine a time domain offset group where the neighboring cell is located according to the RSS time domain offset of the serving cell. The terminal may also calculate the position within the group according to the cell identification of the neighboring cell, so that the RSS time domain offset of the neighboring cell is obtained from the time domain offset group according to the position within the group.

For example, the above 1210 may include: a number of time domain offsets in the time domain offset group is moduloed by the cell identifier of the neighboring cell to obtain a position within a group; the above 1220 may include: the RSS time domain offset of the neighboring cell is acquired from a time domain offset group where the RSS time domain offset of the neighboring cell is located according to the position within the group. The position within the group=CELL ID mod M is defined, the CELL ID is the cell identification of the neighboring cell, M is the number of time domain offsets in the time domain offset group, so that the position within the group may be calculated and obtained conveniently.

For example, the above 930 may further include: the RSS time domain offset of the neighboring cell is calculated by a following formula: $T_{offset\_N}=T_{offset\_S}-(T_{offset\_S} \mod M)+(CELL\ ID_N \mod M)$, where $T_{offset\_N}$ is an RSS time domain offset of the neighboring cell, $T_{offset\_S}$ is the RSS time domain offset of the serving cell, M is the number of time domain offsets in the time domain offset group, and CELL $ID_N$ is the cell identifier of the neighboring cell. According to the above formula, a time domain offset group where the serving cell and the neighboring cell are located is calculated through $T_{offset\_S} \mod M$, and position information in the time domain offset group of the neighboring cell is calculated through CELL $ID_N \mod M$, so that the time domain offset of the neighboring cell is calculated.

For example, the RSS configuration information of the neighboring cell may be acquired according to the cell identifier and the second information from the base station. For example, in a case where the RSS time domain offset of the serving cell and the RSS time domain offset of the neighboring cell are located in a same time domain offset group, FIG. 13 is a flowchart of an information indication method provided in an embodiment of the present disclosure, that the RSS configuration information of the neighboring cell is acquired according to the second information from the base station of the neighboring cell and the cell identifier of the neighboring cell may include described below.

In 1310, a primary relative time domain offset of the RSS of the neighboring cell in the time domain offset group is acquired according to the position within the group indication included in the second information from the neighboring cell.

In 1320, a secondary relative time domain offset is calculated according to the cell identifier of the neighboring cell.

In 1330, the RSS time domain offset of the neighboring cell is acquired in the time domain offset group according to the primary relative time domain offset and the secondary relative time domain offset.

In this example implementation, both the primary relative time domain offset and the secondary relative time domain offset may be an offset value of a certain reference position in the relative time domain offset group. A reference position of the primary relative time domain offset may be a center position, a starting position or a preset position of the time domain offset set. The reference position of the secondary relative time domain offset may be an RSS time domain offset value corresponding to a primary relative time domain offset value.

An offset value of the primary time domain offset and an offset value of the secondary time domain offset relative to the reference position may be a forward offset value of the reference position and may also be a backward offset value of the reference position. Offset directions of the primary time domain offset and the secondary time domain offset may be the same or different. For example, a primary relative time domain offset of 3 is obtained according to the position within the group indication in the second information, and the offset direction is a backward, i.e., two values are offset backward at the starting position of the time domain offset group; if the secondary relative time domain offset is 2 and the offset direction is a forward according to the cell identification CELL ID MOD M (M is a number of positions in the group) of the neighboring cell, on the basis that the initial position determined by the primary relative time domain offset is offset backwards by two values, the 2 values are offset forwards, 1 position behind the initial position of the time domain offset group is obtained, and the 1 position is determined as the time domain offset value of the neighboring cell.

FIG. 14 is a flowchart of an information indication method provided in an embodiment of the present disclosure, the above 930 in which the RSS configuration information of the neighboring cell is acquired according to the cell identifier of the neighboring cell includes described below In 1410, a relative time domain offset is calculated according to the cell identification of the neighboring cell.

In 1420, the RSS time domain offset of the neighboring cell is acquired from an RSS time domain offset interval according to the relative time domain offset.

When the RSS time domain offset is configured for each cell, the RSS frequency domain position of each cell may be configured in a predefined RSS time domain offset interval, and the relative time domain offset (an offset value of the RSS time domain offset of the neighboring cell relative to a certain reference position in the interval) of the neighboring cell may also be defined to be obtained by the cell identifier.

For example, the above 1410 may include: a number of relative time domain offsets in the RSS time domain offset interval is moduloed by the cell identifier of the neighboring cell to obtain the relative time domain offset; the above 1420 may include: the RSS time domain offset of the neighboring cell is obtained in the RSS time domain offset interval according to the relative time domain offset. The position within the group=CELL ID mod L is defined, the CELL ID is the cell identification of the neighboring cell, L is the number of time domain offsets in the time domain offset interval, so that the position within the group may be calculated and obtained conveniently.

In an example implementation, the above 930 in which the RSS configuration information of the neighboring cell is acquired according to the cell identifier of the neighboring cell may further include: a position within a set of a candidate RSS time domain offset set is calculated according to the cell identifier of the neighboring cell; and the RSS time domain offset of the neighboring cell is acquired in the candidate RSS time domain offset set according to the position within the set.

The candidate RSS time domain offset set may be a preconfigured RSS time domain offset set, is also configured according to third information from the base station, and may include a neighboring RSS time domain offset or a non-neighboring RSS time domain offset.

For example, the third information and the first information may be configured in same signaling. For example, a content in the signaling includes four values of 1, 4, 8 and 16, when the value is 1, the RSS configuration information of the serving cell and the neighboring cell is the same, and when the value is 4, 8 or 16, the first 4, 8 or 16 values in a value set of the RSS time domain offset are selected. The terminal may calculate the position within the set through the cell identification of the neighboring cell. The position within the set may be an offset value relative to a reference position or may be a numbering of a candidate RSS time domain offset within the set. For example, there are a total of J time domain offsets within the set, the candidate RSS time domain offsets within the set are numbered 0-(J−1), and the position within the set may be denoted by the numbering. The reference position may be a starting position, a center point, or a center position within the set, and the offset direction may be a forward or a backward.

For example, that the position within the set of the candidate RSS time domain offset set is calculated according to the cell identifier of the neighboring cell may include: the number of RSS time domain offsets in the candidate RSS time domain offset set is moduloed according to the cell identifier of the neighboring cell to obtain the position within the set.

For example, the calculation of the relative time domain offset described above may also refer to the previous embodiment, where the offset calculation is performed twice according to the cell identifier and the relative time domain offset in the second information.

An embodiment of the present disclosure further provides an information indication method, such as a flowchart of the information indication method shown in FIG. 15, the information indication method includes described below.

In 1510, RSS configuration information of a serving cell is received from a base station.

In 1520, RSS configuration information of a neighboring cell is determined according to the RSS configuration information of the serving cell.

The above information indicating method may be implemented by the terminal.

According to the above embodiment, the base station does not need to perform an information indication, the terminal receives the RSS configuration information of the serving cell according to a predefined rule, the RSS configuration information of the neighboring cell may be determined according to the RSS configuration information of the serving cell, so that the signaling overhead is further reduced. The following example embodiment for determining the RSS configuration information of the neighboring cell according to the RSS configuration information of the serving cell may be correspondingly set with reference to other embodiments of the present application, and has corresponding beneficial effects.

For example, an RSS frequency domain position of the serving cell and an RSS frequency domain position of the neighboring cell are located in a same narrow band.

For example, that the RSS configuration information of the neighboring cell is determined according to the RSS configuration information of the serving cell includes: a narrow band where the RSS frequency domain position of the neighboring cell is located is determined according to the RSS frequency domain position of the serving cell; and a number of positions of a narrow band is moduloed to obtain position information within the narrow band of an RSS of the neighboring cell according to a cell identifier of the neighboring cell.

For example, that the RSS configuration information of the neighboring cell is determined according to the RSS configuration information of the serving cell includes: a narrow band where the RSS frequency domain position of the neighboring cell is located is determined according to a narrow band where the RSS frequency domain position of the serving cell is located; and a position of the RSS frequency domain position of the neighboring cell within the narrow band is obtained according to a position indication within a narrow band from the base station; where the position within the narrow band is one of: a first physical resource block (PRB) within the narrow band and a second PRB within the narrow band; a third PRB within the narrow band and a fourth PRB within the narrow band; or a fifth PRB within the narrow band and a sixth PRB within the narrow band.

For example, an RSS time domain offset candidate position includes H time domain offset groups, each RSS time domain offset group includes M positions, an RSS time domain offset of the serving cell and an RSS time domain offset of the neighboring cell are located in a same time domain offset group.

For example, that the RSS configuration information of the neighboring cell is determined according to the RSS configuration information of the serving cell includes: a time domain offset group where the RSS time domain offset of the neighboring cell is located is determined according to the RSS time domain offset of the serving cell; and a number of time domain offsets in the time domain offset group is moduloed according to a cell identifier of the neighboring cell to obtain a position within a group of the neighboring cell.

For example, that the RSS configuration information of the neighboring cell is determined according to the RSS configuration information of the serving cell includes: a time domain offset group where the RSS time domain offset of the neighboring cell is located is determined according to the RSS time domain offset of the serving cell; and a position of the RSS time domain offset of the neighboring cell in the time domain offset group is obtained according to second information from the base station.

Application Example One

The present application example presents an information indication method, the method includes described below.

In 101, the base station indicates whether RSS configuration information (including an RSS frequency domain position and an RSS time domain offset) of all neighboring cells of the serving cell is the same as RSS configuration information of the serving cell through 1 bit signaling.

In 102, if same, then the terminal acquires an RSS frequency domain position and an RSS time domain offset of each neighboring cell according to the RSS configuration information of the serving cell.

In 103, if different, then the RSS frequency domain position and the RSS time domain offset of each neighboring cell is determined according to a cell identifier (CELL ID) of the neighboring cell.

For a certain neighbor, the RSS frequency domain position of the neighboring cell and the RSS frequency domain position of the serving cell are configured on a same narrow band, and a position of a starting PRB position (lowermost RSS PRB) of RSS within the narrow band is PRB #0, PRB #2, or PRB #4, as shown in FIG. 5. A frequency domain position of an RSS of the serving cell or an RSS of the neighboring cell within the narrow band is determined by CELL ID mod 3 (CELL ID moduloing 3). The terminal determines the RSS frequency domain position through the following: a narrow band where the RSS of the neighboring cell is located is determined according to the RSS frequency domain position of the serving cell; and on the narrow band, a frequency domain position of the RSS of the neighboring cell within the narrow band is determined according to the CELL ID mod 3 (CELL ID moduloing 3) of the neighboring cell.

For a certain neighboring cell, the RSS time domain offset of the neighboring cell and the time domain offset of the serving cell may be configured in a same time domain offset group, where N RSS time domain offset values are divided into N/M RSS time domain offset groups with M as a group, and N is a multiple of M, optionally, N=32, M is 4 or 8. In the time domain offset group, the RSS time domain offset of the serving cell or the RSS time domain offset of the neighboring cell is determined by a CELL ID mod 4. The terminal determines the RSS time domain offset through the following: an RSS time domain offset group where the RSS time domain offset of the neighboring cell is located is determined according to the RSS time domain offset of the serving cell; and in the RSS time domain offset group, the RSS time domain offset of the neighboring cell is determined according to the CELL ID mod 4 of the neighboring cell (CELL ID moduloing 4).

According to the method of the application example, whether the RSS position information of each neighboring cell is the same as the RSS position information of the serving cell is indicated through 1 bit, and the RSS position information is determined through the CELL ID in a case where the RSS position information of each neighboring cell is different form the RSS position information of the serving cell, so that the flexibility of configuring the RSS position to a certain extent is ensured, and meanwhile, the indication overhead of the RSS position information is greatly reduced.

Application Example Two

The present application example presents an information indication method, the method includes described below.

In 201, the base station indicates whether RSS configuration information (including an RSS frequency domain position and an RSS time domain offset) of all neighboring cells of the serving cell is the same as RSS configuration information of the serving cell through 1 bit signaling.

In 202, if same, then the terminal acquires an RSS frequency domain position and an RSS time domain offset of each neighboring cell according to the RSS configuration information of the serving cell.

In 203, if different, then the RSS frequency domain position and the RSS time domain offset of each neighboring cell is determined according to a cell identifier (CELL ID).

For a certain neighboring cell, the RSS frequency domain position of the neighboring cell and the RSS frequency domain position of the serving cell are configured in a predefined RSS frequency domain interval. A relative frequency domain offset of the RSS frequency domain position of the neighboring cell in the RSS frequency domain interval may be a relative frequency domain offset relative to a starting position of the frequency domain interval, and a relative frequency domain offset relative to the center point, the center position or the preset position of the frequency domain interval. There are Q relative frequency domain offset values in total; and a relative frequency domain offset of the RSS frequency domain position of the neighboring cell in the RSS frequency domain interval is determined by a cell identifier CELL ID of the neighboring cell, namely the relative frequency domain offset is equal to CELL ID mod Q.

For a certain neighboring cell, an RSS time domain offset $T_{offset\_N}$ of the neighboring cell and a time domain offset configuration $T_{offset\_S}$ of the serving cell are in a same time domain offset group, where N RSS time domain offset values are divided into N/M RSS time domain offset groups with M as a group, and N is a multiple of M, typically, N=32, M is 4 or 8; in the time domain offset group, an RSS time domain offset of the serving cell or an RSS time domain offset of the neighboring cell is determined by the CELL ID mod 4; and the RSS time domain offset of the neighboring cell is expressed as $T_{offset\_N}=T_{offset\_S}-(T_{offset\_S} \bmod M)+$ (CELL $ID_N$ mod M), where CELL $ID_N$ is the cell identifier of the neighboring cell.

According to the method of the application example, whether the RSS configuration of each neighboring cell is the same as that of the serving cell is indicated through 1 bit, and the RSS configuration information is determined through the CELL ID in a case where the RSS configuration of each neighboring cell is different from that of the serving cell, so that the flexibility of configuring the RSS position to a certain extent is ensured, and meanwhile, the indication overhead of the RSS position information is greatly reduced.

Application Example Three

The present application example provides an information indication method, and for a condition that an RSS position of a neighboring cell is different from that of a serving cell, the present application example may set one of an RSS frequency domain position or an RSS time domain offset of the neighboring cell to be different from that of the serving cell when the RSS is configured for each cell according to a predefined rule.

In 301, the base station indicates whether RSS configuration information (including an RSS frequency domain position and an RSS time domain offset) of all neighboring cells of the serving cell is the same as an RSS position of the serving cell through 1 bit signaling.

In 302, if same, then the terminal acquires an RSS frequency domain position and an RSS time domain offset of each neighboring cell according to the RSS configuration information of the serving cell.

In 303, if different, then the terminal determines an RSS frequency domain position of each neighboring cell according to a cell identifier (CELL ID), and if the RSS frequency domain position of the neighboring cell is different from the RSS frequency domain position of the serving cell, then the RSS time domain offset is the same as the serving cell.

For a certain neighboring cell, the RSS frequency domain position of the neighboring cell and the RSS frequency domain position of the serving cell are configured on a same narrow band, and a position of a starting PRB position (lowermost RSS PRB) of RSS within the narrow band is PRB #0, PRB #2, or PRB #4, as shown in FIG. 5. A frequency domain position of the RSS of the serving cell or the RSS of the neighboring cell within the narrow band is determined by CELL ID mod 3 (CELL ID moduloing 3). The terminal determines the RSS frequency domain position through the following: a narrow band where the RSS of the neighboring cell is located is determined according to the RSS frequency domain position of the serving cell; and on the narrow band, a frequency domain position of the RSS of the neighboring cell within the narrow band is determined according to the CELL ID mod 3 (CELL ID moduloing 3) of the neighboring cell.

If the RSS frequency domain position of the neighboring cell is the same as the RSS frequency domain position of the serving cell, then the RSS time domain offset is further determined.

For a certain neighboring cell, the RSS time domain offset of the neighboring cell and the time domain offset of the serving cell are configured in a same time domain offset group, where N RSS time domain offset values are divided into N/M RSS time domain offset groups, and N is a multiple of M with M as a group, optionally, N=32, M is 4 or 8. In the time domain offset group, the RSS time domain offset of the serving cell or the RSS time domain offset of the neighboring cell is determined by the CELL ID mod 4; and the terminal determines the RSS time domain offset through the following: an RSS time domain offset group where the RSS time domain offset of the neighboring cell is located is determined according to the RSS time domain offset of the serving cell; and in the RSS time domain offset group, the RSS time domain offset of the neighboring cell is determined according to a CELL ID mod 4 of the neighboring cell (CELL ID moduloing 4).

According to the method of the application example, whether the RSS configuration information of each neighboring cell is the same as that of the serving cell is indicated through 1 bit, and the RSS frequency domain position information of the neighboring cell is determined through the CELL ID in a case where the RSS configuration information of each neighboring cell is different from that of the serving cell, if the RSS frequency domain position of the neighboring cell is the same as that of the serving cell, then the RSS time domain offset of the neighboring cell is further determined, so that the flexibility of configuring the RSS position to a certain extent is ensured, and meanwhile, the indication overhead of the RSS position information is greatly reduced.

Application Example Four

The present application example provides an information indication method. The method includes described below.

In 401, the base station indicates whether RSS frequency domain positions of all neighboring cells of the serving cell are the same as an RSS frequency domain position of the serving cell through 1 bit signaling, and/or indicates whether RSS time domain offsets of all neighboring cells of the serving cell are the same as an RSS time domain offset of the serving cell through 1 bit signaling.

In 402, if same, then the terminal acquires an RSS frequency domain position and/or an RSS time domain offset of each neighboring cell according to the RSS frequency domain position and/or the time domain offset of the serving cell.

In 403, if different, then an RSS frequency domain position and/or an RSS time domain offset of each neighboring cell is determined according to a cell identifier (CELL ID).

For a certain neighboring cell, the RSS frequency domain position of the neighboring cell and the RSS frequency domain position of the serving cell are configured on a same narrow band, and a position of a starting PRB position (lowermost RSS PRB) of RSS within the narrow band is PRB #0, PRB #2, or PRB #4, as shown in FIG. 5. A frequency domain position of an RSS of the serving cell or an RSS of the neighboring cell within the narrow band is determined by CELL ID mod 3 (CELL ID moduloing 3). The terminal determines the RSS frequency domain position through the following: a narrow band where the RSS of the neighboring cell is located is determined according to the RSS position of the serving cell; and on the narrow band, a frequency domain position of the RSS of the neighboring cell within the narrow band is determined according to the CELL ID mod 3 of the neighboring cell.

For a certain neighboring cell, the RSS time domain offset of the neighboring cell and the time domain offset of the serving cell are configured in a same time domain offset group, where N RSS time domain offset values are divided into N/M RSS time domain offset groups with M as a group, and N is a multiple of M, optionally, N=32, M is 4 or 8. In the time domain offset group, the RSS time domain offset of the serving cell or the RSS time domain offset of the neighboring cell is determined by a CELL ID mod 4. The terminal determines the RSS time domain offset through the following: an RSS time domain offset group where the RSS time domain offset of the neighboring cell is located is determined according to the RSS time domain offset of the serving cell; and in the RSS time domain offset group, the RSS time domain offset of the neighboring cell is determined according to the CELL ID mod 4 of the neighboring cell (CELL ID moduloing 4).

According to the method of the application example, whether the RSS position information of each neighboring cell is the same as that of the serving cell is indicated through 1 bit or 2 bits, so that the flexibility of configuring the RSS position to a certain extent is ensured, and meanwhile, the indication overhead of the RSS position information is greatly reduced.

Application Example Five

The present application example provides an information indication method. The method includes described below.

In 501, the base station indicates whether RSS configuration information (including an RSS frequency domain position and an RSS time domain offset) of all neighboring cells of the serving cell is the same as an RSS position of the serving cell through 1 bit signaling.

In 502, if same, then the terminal acquires an RSS frequency domain position and an RSS time domain offset of each neighboring cell according to the RSS configuration information of the serving cell.

In 503, if different, then for each neighboring cell, the base station indicates whether RSS configuration information of each neighboring cell of the serving cell is the same as the RSS configuration information of the serving cell through 1 bit signaling.

For a certain neighboring cell with an RSS configuration information different from the RSS configuration information of the serving cell, the base station additionally indicates the RSS frequency domain position of this neighboring cell by using one of following methods.

A method 1: the RSS frequency domain position of the neighboring cell and an RSS frequency domain position of the serving cell are configured in a predefined RSS frequency domain candidate position, where there are P RSS frequency domain candidate positions in total, and the RSS frequency domain position of the neighboring cell is indicated by $\log_2 P$ bits.

A method 2: the RSS frequency domain position of the neighboring cell and an RSS frequency domain position of the serving cell are configured in a predefined RSS frequency domain interval. A relative frequency domain offset of the RSS frequency domain position of the neighboring cell in the RSS frequency domain interval is indicated through signaling. The relative frequency domain offset may be a relative frequency domain offset relative to a starting position of the frequency domain interval, and may also be a relative frequency domain offset relative to a center point, a center position or a preset position of the frequency domain interval; and if there are Q types of relative frequency domain offset values, then $\log_2 Q$ bits are needed to indicate.

A method 3: an RSS frequency domain position of the neighboring cell and an RSS frequency domain position of the serving cell are configured in a same narrow band; the RSS frequency domain position of the neighboring cell being which of the other two positions of other than the RSS frequency domain position of the serving cell is indicated through 1 bit. For example, if the RSS frequency domain position of the serving cell is at RSS #1, then whether the RSS position of the neighboring cell being RSS #0 or RSS #2 is indicated through 1 bit. The correspondence of the indication information and the RSS frequency domain position may be referred to a following table:

| Indication information | RSS frequency domain position of the neighboring cell |
|---|---|
| 0 | the RSS frequency domain position with the low RSS starting PRB in two other RSS frequency domain positions different from the serving cell |
| 1 | the RSS frequency domain position with the high RSS starting PRB in two other RSS frequency domain positions different from the serving cell |

For a certain neighboring cell with an RSS configuration information different from the RSS configuration information of the serving cell, the base station additionally indicates the RSS time domain offset of the neighboring cell by using one of following methods.

A method 1: the RSS time domain offset of the neighboring cell and the RSS time domain offset of the serving cell are configured in a predefined RSS time domain offset candidate position, where there are L candidate RSS time domain offset values in total, and the RSS time domain offset of the neighboring cell is indicated by $\log_2 L$ bits.

A method 2: the RSS frequency domain position of the neighboring cell and an RSS frequency domain position of the serving cell are configured in a predefined time domain offset interval. A relative time domain offset of the RSS time domain offset of the neighboring cell in the time domain offset value interval is indicated through signaling. The relative time domain offset may be a relative offset relative to a starting position of the RSS time domain offset value interval, and may also be a relative offset relative to a center point, a center position, or a preset position of the RSS time domain offset value interval.

There are S types of relative time domain offset values, and $\log_2 S$ bits are needed to indicate.

For example, the following code is executed to implement the information indication method:

```
{ Same-RSSlocation-AllNeighboringCell   BOOLEAN,
   RSSlocation-Config-List
   -- Following fields are optional, only when Same-RSSlocation-AllNeighboringCell is equal
to FALSE, the fields exist, an RSS configuration information list (RSSlocation-Config-List)
contains each neighboring cell; when Same-RSSlocation-AllNeighboringCell is equal to TRUE,
the fields don't exist.
   {
   Same-RSSlocation-NeighboringCell   BOOLEAN,
   RSS-Freq-LocationINTEGER(0..3)
   RSS-TimeoffsetINTEGER(0..3)
   }
}
```

According to the method of the application example, the RSS position information of each neighboring cell in a certain range is indicated through additional information, and the flexibility of configuring the RSS position is ensured on the basis that the indication overhead of the RSS position information is reduced.

Application Example Six

The present application example provides an information indication method. The method includes described below.

In 601, the base station indicates whether RSS frequency domain positions of all neighboring cells of the serving cell are the same as an RSS frequency domain position of the serving cell through 1 bit signaling, and/or indicates whether RSS time domain offsets of all neighboring cells of the serving cell are the same as an RSS time domain offset of the serving cell through 1 bit signaling.

In 602, if same, then the terminal acquires an RSS frequency domain position and an RSS time domain offset of each neighboring cell according to the RSS position of the serving cell.

In 603, if different, then for each neighboring cell, the base station indicates whether an RSS frequency domain position of a certain neighboring cell of the serving cell is the same as an RSS frequency domain position of the serving cell through 1 bit signaling and/or indicates whether an RSS time domain offset of a certain neighboring cell of the serving cell is the same as the RSS time domain offset of the serving cell through 1 bit signaling.

For a certain neighboring cell with an RSS frequency domain position different from the RSS frequency domain position of the serving cell, the RSS frequency domain position of this neighboring cell is additionally indicated by using one of following methods:

A method 1: the RSS frequency domain position of the neighboring cell and the RSS frequency domain offset of the serving cell are configured in a predefined RSS frequency domain candidate position, where there are P RSS frequency domain candidate positions in total, and the RSS frequency domain position of the neighboring cell is indicated by $\log_2 P$ bits.

A method 2: the RSS frequency domain position of the neighboring cell and an RSS frequency domain position of the serving cell are configured in a predefined RSS frequency domain interval. A relative frequency domain offset of the RSS frequency domain position of the neighboring cell in the RSS frequency domain interval is indicated through signaling. The relative frequency domain offset may be a relative frequency domain offset relative to a starting position of the frequency domain interval, and may also be a relative frequency domain offset relative to a center point, a center position or a preset position of the frequency domain interval; and if there are Q types of relative frequency domain offset values, then $\log_2 Q$ bits are needed to indicate.

A method 3: an RSS frequency domain position of the neighboring cell and an RSS frequency domain position of the serving cell are configured in a same narrow band. The RSS frequency domain position of the neighboring cell being which of the other two positions of other than the RSS frequency domain position of the serving cell is indicated by the base station through 1 bit. For example, if the RSS frequency domain position of the serving cell is at RSS #1, then whether the RSS position of the neighboring cell being RSS #0 or RSS #2 is indicated through 1 bit.

For a certain neighboring cell in which the RSS time domain offset is different from the RSS time domain offset of the serving cell, the RSS time domain offset of this neighboring cell is additionally indicated by adopting one of following methods:

A method 1: the RSS time domain offset of the neighboring cell and the RSS time domain offset of the serving cell are configured in a predefined RSS time domain offset candidate position, where there are L candidate RSS time domain offset values in total, and the RSS time domain offset of the neighboring cell is indicated by $\log_2 L$ bits.

A method 2: the RSS time domain offset of the neighboring cell and an RSS time domain offset of the serving cell are configured in a predefined time domain offset interval. A relative time domain offset of the RSS time domain offset of the neighboring cell in the time domain offset value interval is indicated through signaling. The relative time domain offset may be a relative offset relative to a starting position of the RSS time domain offset value interval, or may be a relative offset relative to a center point, a center position, or a preset position of the RSS time domain offset value interval. If there are S types of relative time domain offset values, then $\log_2 S$ bits are needed to indicate.

According to the method of the application example, the RSS frequency domain position and/or the PSS time domain offset information of each neighboring cell in a certain range is indicated through additional information, so that the flexibility of configuring the RSS frequency domain position and/or the RSS time domain offset is ensured on the basis that the indication overhead of the RSS position information is reduced.

Application Example Seven

The present application example provides an information indication method. The method includes described below.

In 701, for each neighboring cell, whether an RSS frequency domain position of a certain neighboring cell of the serving cell being the same as an RSS frequency domain position of the serving cell is respectively indicated through 1 bit signaling and/or whether an RSS time domain offset of a certain neighboring cell of the serving cell being the same as the RSS time domain offset of the serving cell is indicated through 1 bit signaling.

In 702, if same, then the terminal acquires the RSS frequency domain position and/or the RSS time domain offset of each neighboring cell according to the RSS configuration information of the serving cell.

For a certain neighboring cell with different RSS frequency domain positions from the RSS frequency domain position of the serving cell, the base station additionally indicates the RSS frequency domain position of the neighboring cell by adopting one of following methods.

A method 1: the RSS frequency domain position of the neighboring cell and the RSS frequency domain offset of the serving cell are configured in a predefined RSS frequency domain candidate position, where there are P RSS frequency domain candidate positions in total, and the RSS frequency domain position of the neighboring cell is indicated by $\log_2 P$ bits.

A method 2: the RSS frequency domain position of the neighboring cell and an RSS frequency domain position of the serving cell are configured in a predefined RSS frequency domain interval. A relative frequency domain offset of the RSS frequency domain position of the neighboring cell in the RSS frequency domain interval is indicated through signaling. The relative frequency domain offset may be a relative frequency domain offset relative to a starting position of the frequency domain interval, and may also be a relative frequency domain offset relative to a center point, a center position or a preset position of the frequency domain interval; and if there are Q types of relative frequency domain offset values, then $\log_2 Q$ bits are needed to indicate.

A method 3: an RSS frequency domain position of the neighboring cell and an RSS frequency domain position of the serving cell are configured in a same narrow band; the RSS frequency domain position of the neighboring cell being which of the other two positions of other than the RSS frequency domain position of the serving cell is indicated through 1 bit. For example, if the RSS frequency domain position of the serving cell is at RSS #1, then whether the RSS position of the neighboring cell being RSS #0 or RSS #2 is indicated through 1 bit.

For a certain neighboring cell with an RSS time domain offset different from the RSS time domain offset of the serving cell, the base station additionally indicates the RSS time domain offset of this neighboring cell by using one of following methods.

A method 1: the RSS time domain offset of the neighboring cell and the RSS time domain offset of the serving cell are configured in a predefined RSS time domain offset candidate position, where there are L candidate RSS time domain offset values in total, and the RSS time domain offset of the neighboring cell is indicated by $\log_2 L$ bits.

A method 2: the RSS frequency domain position of the neighboring cell and an RSS frequency domain position of the serving cell are configured in a predefined time domain offset interval. A relative time domain offset of the RSS time domain offset of the neighboring cell in the time domain offset value interval is indicated through signaling. The relative time domain offset may be a relative offset relative to a starting position of the RSS time domain offset value interval, and may also be a relative offset relative to a center point, a center position, or a preset position of the RSS time domain offset value interval. If there are S types of relative time domain offset values, then $\log_2 S$ bits are needed to indicate.

According to the method of the application example, whether the RSS frequency domain position and/or the RSS time domain offset of each neighboring cell being the same as that of the serving cell is respectively indicated, and for different neighboring cells, the RSS frequency domain position and/or the RSS time domain offset information of each neighboring cell in a certain range is indicated through additional information, so that the flexibility of configuring the RSS frequency domain position and/or the RSS time domain offset is ensured on the basis that the indication overhead of the RSS position information is reduced.

Application Example Eight

The present application example provides an information indication method. The method includes described below.

In 801, the base station indicates whether a number of CRS ports of all neighboring cells of the serving cell is the same as a number of CRS ports of the serving cell through 1 bit signaling.

In 802, if same, then the terminal acquires the number of CRS ports of the neighboring cell according to the number of CRS ports of the serving cell.

In 803, if different, then for each neighboring cell with a number of CRS ports different from the number of CRS ports of the serving cell, the base station indicates a number of CRS ports of a certain neighboring cell through 1 bit signaling. Specifically, the number of CRS ports of the neighboring cell is a low value or a high value in two port values other than the number of CRS ports of the serving cell is indicated through 1 bit. For example, if the number of CRS ports of the serving cell is 2, if a number of CRS ports of a certain neighboring cell is different from that of the serving cell, the number of CRS ports of the neighboring cell is 1 or 4 is indicated by 1 bit, and a correspondence between the indication information and the number of CRS ports may be referred to a following table.

| Indication information | a number of CRS ports |
|---|---|
| 0 | low value of the other two of the number of CRS ports different from the serving cell |
| 1 | high value of the other two of the number of CRS ports different from the serving cell |

For example, the information indication method described above may be implemented by following codes:

```
{ Same-number-of-CRSports-All   BOOLEAN,
   CRSport-Config-List
   -- Following fields are optional, only when Same-number-of-CRSports-All is equal to FALSE,
the fields exist, where the number of CRS ports configuration list (CRSport-Config-List) contains
each neighboring cell; when Same-number-of-CRSports-All is equal to TRUE, the fields don't
exist.
   {
   Same-number-of-CRSports   BOOLEAN,
   Number of CRSports      ENUMERATED {nL, nH} --optionally, this field exists only
when Same-number-of-CRSports is equal to FALSE, nL refers to a low value of the other two of
the number of CRS ports different from the number of ports of the serving cell, and NH refers to
a high value of the other two of the number of CRS ports different from the number of ports of the
serving cell.
   }
}
```

According to the method of the application example, for a scene in which the number of CRS ports of all neighboring cells is the same as that of the serving cell, the signaling overhead may be greatly saved.

Application Example Nine

The present application example provides an information indication method. The method includes described below.

In 901, for each neighboring cell, the base station indicates whether a number of CRS ports of each neighboring cell is the same as the number of CRS ports of the serving cell through 1 bit signaling.

In 902, if same, then the terminal obtains the number of CRS ports of the neighboring cell according to the number of CRS ports of the serving cell.

In 903, if different, then for a neighboring cell with a number of ports different from the number of ports of the serving cell, the base station indicates the number of CRS ports of the neighboring cell through 1 bit signaling. Specifically, the number of ports of the neighboring cell is a low value or a high value in two port values other than the number of CRS ports of the serving cell is indicated through 1 bit.

According to the method of the application example, for a scene in which the number of CRS ports of most neighboring cells is the same as that of the serving cell, the signaling overhead may be greatly saved.

Figure 16:
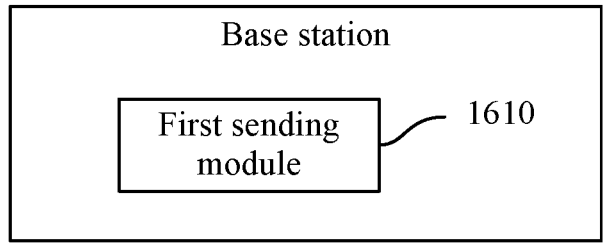
FIG. 16 is a schematic structural diagram of a base station provided in an embodiment of the present disclosure.

An embodiment of the present disclosure provides a base station. FIG. 16 is a schematic structural diagram of a base station provided in an embodiment of the present disclosure. The base station includes a first sending module 1610. The first sending module 1610 is configured to send first information to a terminal, where the first information includes a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell.

For example, the RSS configuration indication is used for indicating whether RSS configuration information of all neighboring cells is the same as the RSS configuration information of the serving cell.

For example, the RSS configuration indication is used for respectively indicating whether RSS configuration information of each neighboring cell is the same as the RSS configuration information of the serving cell.

Figure 17:
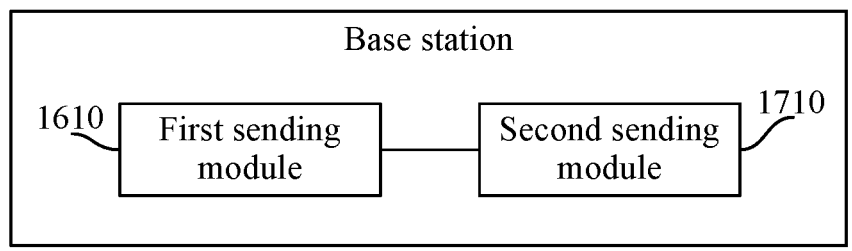
FIG. 17 is a schematic structural diagram of a base station provided in an embodiment of the present disclosure.

For example, FIG. 17 is a schematic structural diagram of a base station provided in an embodiment of the present disclosure. The base station may further include a second sending module 1710. The second sending module 1710 is configured to send second information to the terminal in a case where the RSS configuration information of the neighboring cell is different from the RSS configuration information of the serving cell.

For example, the RSS configuration information of the neighboring cell being the same as the RSS configuration information of the serving cell includes at least one of: an RSS frequency domain position of the neighboring cell is the same as an RSS frequency domain position of the serving cell; an RSS time domain offset of the neighboring cell is the same as an RSS time domain offset of the serving cell; or a number of cell-specific reference signal (CRS) ports of the neighboring cell is the same as a number of CRS ports of the serving cell.

For example, the second information includes at least one of: a frequency domain candidate position indication, which is used for indicating a position of an RSS of the neighboring cell in a frequency domain candidate position; a relative frequency domain offset, which is used for indicating a position of an RSS of the neighboring cell in an RSS frequency domain interval; or an indication for a position within a narrow band, which is used for indicating a position of an RSS of the neighboring cell in a narrow band, where an RSS frequency domain position of the serving cell and an RSS frequency domain position of the neighboring cell are located in a same narrow band.

For example, the second information includes at least one of: a time domain candidate position indication, which is used for indicating a position of an RSS of the neighboring cell in multiple RSS time domain offset candidate positions; a relative time domain offset, which is used for indicating a position of the RSS of the neighboring cell in an RSS time domain offset interval; or an indication for a position within a group, which is used for indicating a position of the RSS of the neighboring cell in a time domain offset group, and an RSS time domain offset of the serving cell and an RSS time domain offset of the neighboring cell are located in a same time domain offset group.

For example, multiple RSS time domain offset candidate positions include H time domain offset groups, and each time domain offset group includes M RSS time domain offset values.

For example, the second information includes an indication of a number of CRS ports, and the indication of the number of CRS ports is used for indicating that a number of CRS ports of the neighboring cell is a relatively high value or a relatively low value of two of a number of candidate ports other than a number of CRS ports of the serving cell.

Figure 18:
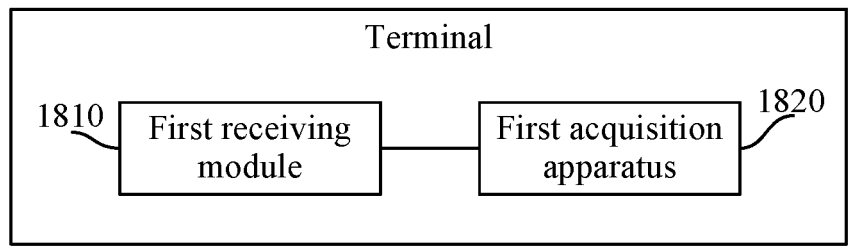
FIG. 18 is a schematic structural diagram of a terminal provided in an embodiment of the present disclosure.

FIG. 18 is a schematic structural diagram of a terminal provided in an embodiment of the present disclosure. The terminal includes a first receiving module 1810 and a first acquisition apparatus 1820. The first receiving module 1810 is configured to receive first information from a base station, the first information includes a re-synchronization signal (RSS) configuration indication, and the RSS configuration indication is used for indicating whether RSS configuration information of a neighboring cell is the same as RSS configuration information of a serving cell. The first acquisition apparatus 1820 is configured to acquire the RSS configuration information of the neighboring cell according to the RSS configuration information of the serving cell in a case where the RSS configuration information of the neighboring cell is the same as the RSS configuration information of the serving cell.

For example, the RSS configuration indication is used for indicating whether RSS configuration information of all neighboring cells is the same as the RSS configuration information of the serving cell.

For example, the RSS configuration indication is used for respectively indicating whether RSS configuration information of each neighboring cell is the same as the RSS configuration information of the serving cell.

Figure 19:
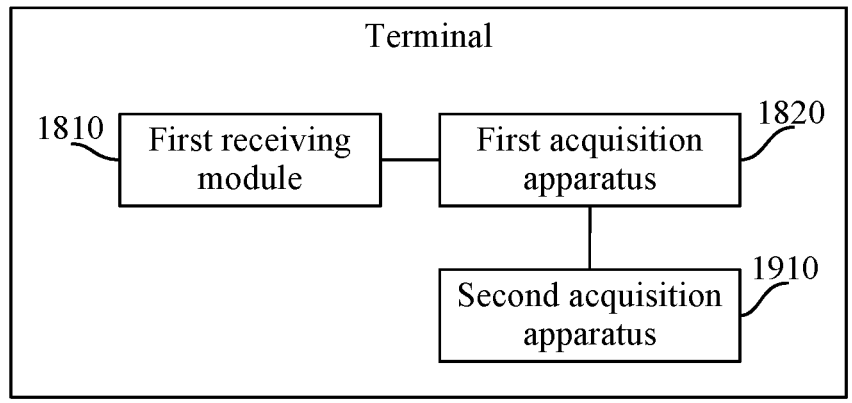
FIG. 19 is a schematic structural diagram of a terminal provided in an embodiment of the present disclosure.

For example, FIG. 19 is a schematic structural diagram of a terminal provided in an embodiment of the present disclosure. The terminal may further include a second acquisition apparatus 1910. The second acquisition apparatus 1910 is configured to acquire the RSS configuration information of the neighboring cell according to second information from the base station in a case where the RSS configuration information of the neighboring cell is different from the RSS configuration information of the serving cell.

Figure 20:
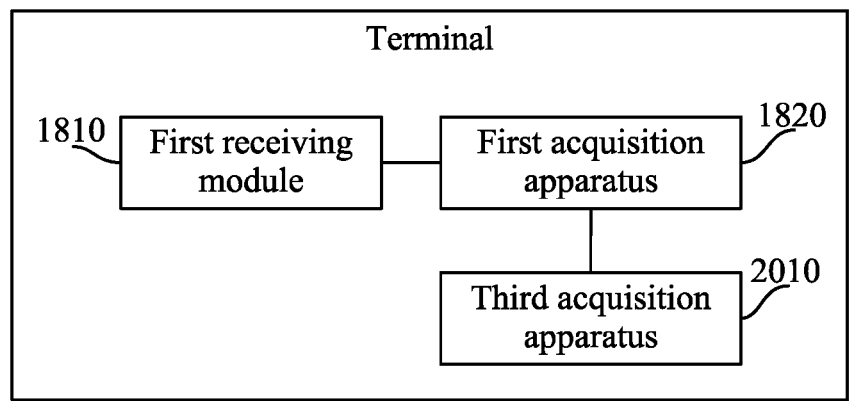
FIG. 20 is a schematic structural diagram of a terminal provided in an embodiment of the present disclosure.

For example, FIG. 20 is a schematic structural diagram of a terminal provided in an embodiment of the present disclosure. The terminal may further include a third acquisition apparatus 2010. The third acquisition apparatus 2010 is configured to acquire the RSS configuration information of the neighboring cell according to a cell identifier of the neighboring cell in a case where the RSS configuration information of the neighboring cell is different from the RSS configuration information of the serving cell.

For example, the RSS configuration information of the neighboring cell being the same as the RSS configuration information of the serving cell includes at least one of: an RSS frequency domain position of the neighboring cell is the same as an RSS frequency domain position of the serving cell; an RSS time domain offset of the neighboring cell is the same as an RSS time domain offset of the serving cell; or a number of cell-specific reference signal (CRS) ports of the neighboring cell is the same as a number of CRS ports of the serving cell.

Figure 21:
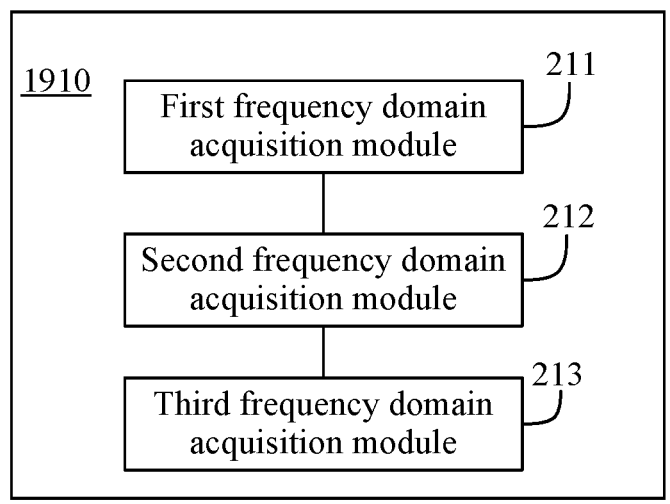
FIG. 21 is a schematic structural diagram of a terminal provided in an embodiment of the present disclosure.

For example, FIG. 21 is a schematic structural diagram of a terminal provided in an embodiment of the present disclosure. The second acquisition apparatus 1910 includes at least one of a first frequency domain acquisition module 211, a second frequency domain acquisition module 212, or a third frequency domain acquisition module 213. The first frequency domain acquisition module 211 is configured to acquire an RSS frequency domain position of the neighboring cell from multiple RSS frequency domain candidate positions according to a frequency domain candidate position indication included in the second information. The second frequency domain acquisition module 212 is configured to acquire an RSS frequency domain position of the neighboring cell from an RSS frequency domain interval according to a relative frequency domain offset included in the second information. The third frequency domain acquisition module 213 is configured to acquire an RSS frequency domain position of the neighboring cell from a narrow band according to an indication for a position within a narrow band included in the second information, where an RSS frequency domain position of the serving cell and the RSS frequency domain position of the neighboring cell are located in a same narrow band.

Figure 22:
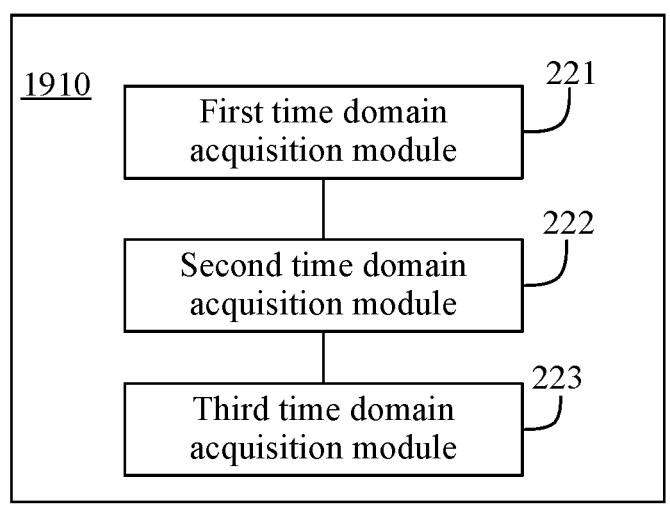
FIG. 22 is a schematic structural diagram of a terminal provided in an embodiment of the present disclosure.

For example, FIG. 22 is a schematic structural diagram of a terminal provided in an embodiment of the present disclosure. The second acquisition apparatus 1910 includes at least one of a first time domain acquisition module 221, a second time domain acquisition module 222, or a third time domain acquisition module 223. The first time domain acquisition module 221 is configured to acquire an RSS time domain offset of the neighboring cell from multiple RSS time domain offset candidate positions according to a time domain candidate position indication included in the second information. The second time domain acquisition module 222 is configured to acquire an RSS time domain offset of the neighboring cell from an RSS time domain offset interval according to a relative time domain offset included in the second information. The third time domain acquisition module 223 is configured to acquire an RSS time domain offset of the neighboring cell from a time domain offset group according to an indication for a position within a group included in the second information, where an RSS time domain offset of the serving cell and the RSS time domain offset of the neighboring cell are located in a same time domain offset group.

For example, multiple RSS time domain offset candidate positions include H time domain offset groups, and each time domain offset group includes M RSS time domain offset values.

For example, the second acquisition apparatus 1910 may further include a first CRS acquisition module. The first CRS acquisition module is configured to acquire a number of CRS ports of the neighboring cell according to an indication of a number of CRS ports included in the second information; where the indication of the number of CRS ports is used for indicating that the number of CRS ports of the neighboring cell is a relatively high value or a relatively low value of two of a number of candidate ports other than a number of CRS ports of the serving cell.

For example, the third acquisition apparatus 2010 includes at least one of a fourth frequency domain acquisition module or a fifth frequency domain acquisition module. The fourth frequency domain acquisition module is configured to calculate a position within a narrow band according to the cell identifier of the neighboring cell, acquire an RSS frequency domain position of the neighboring cell from a narrow band according to the position within the narrow band, where an RSS frequency domain position of the serving cell and the RSS frequency domain position of the neighboring cell are located in a same narrow band. The fifth frequency domain acquisition module is configured to calculate a relative frequency domain offset according to the cell identifier of the neighboring cell, and acquire an RSS frequency domain position of the neighboring cell from an RSS frequency domain interval according to the relative frequency domain offset.

For example, the fourth frequency domain acquisition module includes a first moduloing unit and a first acquisition unit. The first moduloing unit is configured to modulo a position within a narrow band number by the cell identifier of the neighboring cell to obtain the position within the narrow band. The first acquisition unit is configured to acquire the RSS frequency domain position of the neighboring cell from a narrow band where the RSS frequency domain position of the neighboring cell is located according to the position within the narrow band.

For example, the fifth frequency domain acquisition module includes a second moduloing unit and a second acquisition unit. The second moduloing unit is configured to modulo a number of relative frequency domain offsets in the RSS frequency domain interval by the cell identifier of the neighboring cell to obtain the relative frequency domain offset. The second acquisition unit is configured to acquire the RSS frequency domain position of the neighboring cell from the RSS frequency domain interval according to the relative frequency domain offset.

For example, the third acquisition apparatus 2010 includes at least one of a fourth time domain acquisition module, a fifth time domain acquisition module, or a sixth time domain acquisition module. The fourth time domain acquisition module is configured to calculate a position within a group according to the cell identifier of the neighboring cell, acquire an RSS time domain offset of the neighboring cell from a time domain offset group according to the position within the group, where an RSS time domain offset of the serving cell and the RSS time domain offset of the neighboring cell are located in a same time domain offset group. The fifth time domain acquisition module is configured to calculate a relative time domain offset according to the cell identifier of the neighboring cell, and acquire an RSS time domain offset of the neighboring cell from an RSS time domain offset interval according to the relative time domain offset. The sixth time domain acquisition module is configured to calculate a position within a set of a candidate RSS time domain offset set according to the cell identifier of the neighboring cell, and acquire an RSS time domain offset of the neighboring cell from the candidate RSS time domain offset set according to the position within the set.

For example, multiple RSS time domain offset candidate positions include H time domain offset groups, and each time domain offset group includes M RSS time domain offset values.

For example, the candidate RSS time domain offset set is pre-configured.

For example, the candidate RSS time domain offset set is configured according to third information from the base station.

For example, the fourth time domain acquisition module includes a third moduloing unit and a third acquisition unit. The third moduloing unit is configured to modulo a number of time domain offsets in the time domain offset group by a cell identifier of the neighboring cell to obtain a position within a group. The third acquisition unit is configured to acquire an RSS time domain offset of the neighboring cell from a time domain offset group in which the RSS time domain offset of the neighboring cell is located according to the position within the group.

For example, the fifth time domain acquisition module includes a fourth moduloing unit and a fourth acquisition unit. The fourth moduloing unit is configured to modulo a number of relative time domain offsets in the RSS time domain offset interval by the cell identifier of the neighboring cell to obtain a relative time domain offset. The fourth acquisition unit is configured to acquire the RSS time domain offset of the neighboring cell from the RSS time domain offset interval according to the relative time domain offset.

Figure 23:
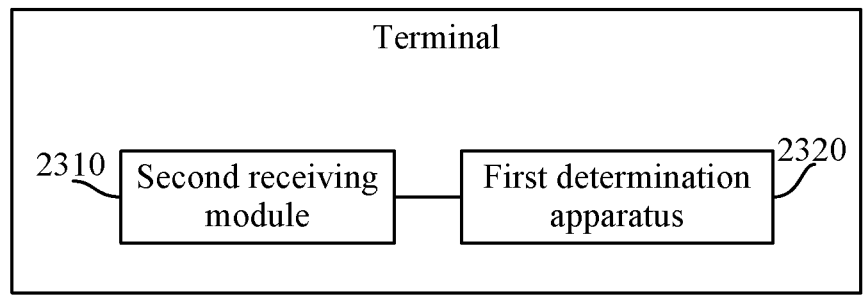
FIG. 23 is a schematic structural diagram of a terminal provided in an embodiment of the present disclosure.

FIG. 23 is a schematic structural diagram of a terminal provided in an embodiment of the present disclosure. The terminal includes a second receiving module 2310 and a first determination apparatus 2320. The second receiving module 2310 is configured to receive RSS configuration information of a serving cell from a base station. The first determination apparatus 2320 is configured to determine RSS configuration information of a neighboring cell according to the RSS configuration information of the serving cell.

For example, an RSS frequency domain position of the serving cell and an RSS frequency domain position of the neighboring cell are located in a same narrow band.

For example, the first determination apparatus 2320 includes a narrow band determination module and a first moduloing module. The narrow band determination module is configured to determine a narrow band where the RSS frequency domain position of the neighboring cell is located according to the RSS frequency domain position of the serving cell. The first moduloing module is configured to modulo a number of positions of a narrow band to obtain position information within the narrow band of an RSS of the neighboring cell according to a cell identifier of the neighboring cell.

For example, the first determination apparatus 2320 includes a narrow band determination module and a second receiving module. The narrow band determination module is configured to determine a narrow band where the RSS frequency domain position of the neighboring cell is located according to a narrow band where the RSS frequency domain position of the serving cell is located. The second receiving module is configured to obtain a position of the RSS frequency domain position of the neighboring cell within the narrow band according to a position indication within a narrow band from the base station. The position within the narrow band is one of: a first physical resource block (PRB) within the narrow band and a second PRB within the narrow band; a third PRB within the narrow band and a fourth PRB within the narrow band; or a fifth PRB within the narrow band and a sixth PRB within the narrow band.

For example, an RSS time domain offset candidate position includes H time domain offset groups, each RSS time domain offset group includes M positions, an RSS time domain offset of the serving cell and an RSS time domain offset of the neighboring cell are located in a same time domain offset group, and H and M are positive integers.

For example, the first determination apparatus 2320 includes a time domain offset group determination module and a second moduloing module.

The time domain offset group determination module is configured to determine a time domain offset group where the RSS time domain offset of the neighboring cell is located according to the RSS time domain offset of the serving cell.

The second moduloing module is configured to modulo a number of time domain offsets in the time domain offset group according to a cell identifier of the neighboring cell to obtain a position within a group of the neighboring cell.

For example, the first determination apparatus 2320 includes a time domain offset group determination module and a third receiving module. The time domain offset group determination module is configured to determine a time domain offset group where the RSS time domain offset of the neighboring cell is located according to the RSS time domain offset of the serving cell. The third receiving module is configured to obtain a position of the RSS time domain offset of the neighboring cell in the time domain offset group according to second information from the base station.

The apparatus provided in the embodiments of the present disclosure, such as a base station or a terminal, may implement the information indication method provided in the embodiments of the present disclosure, and has corresponding beneficial effects.

Figure 24:
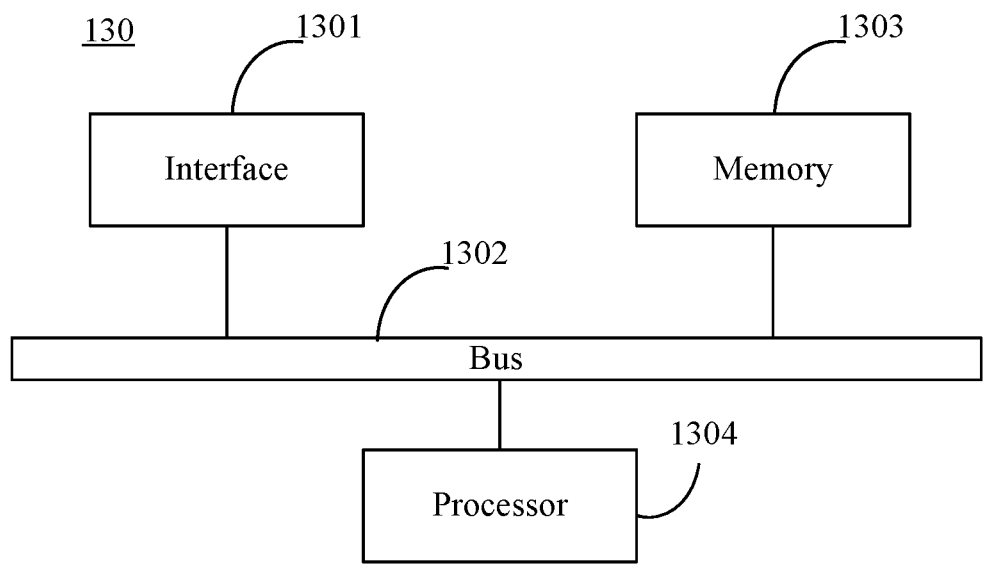
FIG. 24 is a schematic structural diagram of a terminal provided in an embodiment of the present disclosure.

FIG. 24 is a schematic structural diagram of a terminal provided in an embodiment of the present disclosure. As shown in FIG. 24, the terminal 130 provided in the embodiment of the present application includes a memory 1303 and a processor 1304. The terminal 130 may further include an interface 1301 and a bus 1302. The interface 1301, the memory 1303 and the processor 1304 are connected via a bus 1302. The memory 1303 is used for storing an instruction. The processor 1304 is configured to read the instruction to execute the technical scheme of the method embodiment applied to the terminal, and the implementation principle and technical effect thereof are similar, and details are not described herein.

Figure 25:
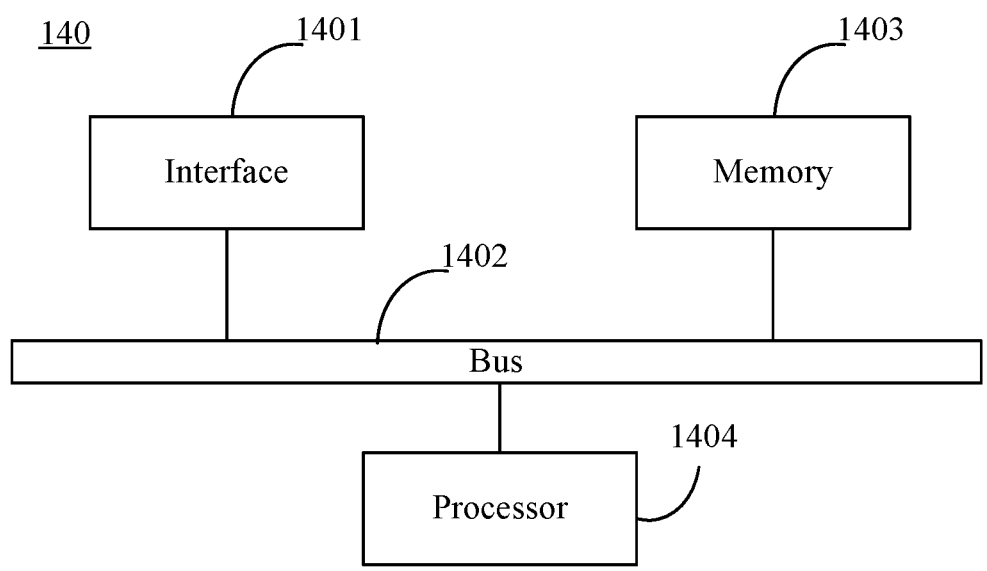
FIG. 25 is a schematic structural diagram of a base station provided in an embodiment of the present disclosure.

FIG. 25 is a schematic structural diagram of a base station provided in an embodiment of the present disclosure. As shown in FIG. 25, the base station 140 provided in the embodiment of the present application includes a memory 1403 and a processor 1404. The base station may further include an interface 1401 and a bus 1402. The interface 1401, the memory 1403 and the processor 1404 are connected via a bus 1402. The memory 1403 is used to store an instruction. The processor 1404 is configured to read the instruction to execute the technical scheme of the method embodiment applied to the base station, and the implementation principle and technical effect thereof are similar, and details are not described herein.

The above description is only an example embodiment of the present application, and is not intended to limit the scope of protection of the present application.

It will be clear to those skilled in the art that the term "user terminal" covers any suitable type of wireless user equipment, such as mobile phones, portable data processing devices, portable web browsers or vehicle-mounted mobile stations.

In general, various embodiments of the present application may be implemented in a hardware or a special purpose circuit, a software, a logic or any combination thereof. For example, some aspects may be implemented in the hardware, while other aspects may be implemented in a firmware or a software which may be executed by a controller, a microprocessor or other computing device, although the present application is not limited thereto.

Embodiments of the present application may be implemented by a data processor of a mobile device through executing a computer program instruction, for example in a processor entity, or through hardware, or through a combination of software and hardware. The computer program instruction may be an assembler instruction, an instruction subversive alliance (ISA) instruction, a machine instruction, a machine-related instruction, a microcode, a firmware instruction, state setting data, or source or object codes written in any combination of one or more programming languages.

Any block diagram of the logic flow in the accompanying drawings of the present application may represent program processes, or may represent interconnected logic circuits, modules, and functions, or may represent a combination of program processes and logic circuits, modules, and functions. The computer program may be stored on a memory. The memory may be of any type suitable for the local technical environment and may be implemented using any suitable data storage technology. The memory in the embodiments of the present application may be either a volatile memory or a nonvolatile memory, or may include both the volatile memory and the nonvolatile memory. The non-volatile memory may be, among other things, a read-only memory (ROM), a programmable ROM (PROM), an erasable PROM (EPROM), an electrically EPROM (EEPROM), or a flash memory. The volatile memory may be a random access memory (RAM), which serves as external cache. The RAM may include multiple forms such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM). The memory of the system and method described in this application includes, but is not limited to, these and any other suitable types of memory.

The processor provided in the embodiments of the present application may be of any type suitable for a local technical environment; for example, and without limitation, a general purpose computer, a special purpose computer, a microprocessor, a digital signal processor (DSP), an application specific integrated circuit (ASIC), a field-programmable gate array (FGPA) or other programmable logic device, a discrete gate or transistor logic, a discrete hardware component, or a processor based on a multi-core processor architecture. The general purpose processor may be a microprocessor or may be any conventional processor and the like. The processor described above may implement or perform the disclosed methods in embodiments of the present application. A software module may be located in a random access memory, a flash memory, a read-only memory, a programmable read-only memory, or an electrically erasable programmable memory, a register, and the like, as is well-established in the art. The storage medium is located in the memory, and the processor reads information in the memory and completes the above methods in combination with hardware thereof.

What is claimed is:
1. An information indication method, comprising:
   sending first information to a terminal, wherein the first information comprises a re-synchronization signal (RSS) configuration indication, the RSS configuration indication is used for indicating whether RSS configuration information of a neighboring cell is the same as

RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell, determining the RSS configuration information of the neighboring cell according to the RSS configuration information of the serving cell in a case where the RSS configuration information of the neighboring cell is different from the RSS configuration information of the serving cell, wherein an RSS time domain offset candidate position comprises H time domain offset groups, each RSS time domain offset group comprises M positions, an RSS time domain offset of the serving cell and an RSS time domain offset of the neighboring cell are located in a same time domain offset group, and H and M are positive integers, wherein determining the RSS configuration information of the neighboring cell according to the RSS configuration information of the serving cell comprises:

determining a time domain offset group where the RSS time domain offset of the neighboring cell is located according to the RSS time domain offset of the serving cell; and moduloing a number of time domain offsets in the time domain offset group according to a cell identifier of the neighboring cell to obtain a position within a group of the neighboring cell.

2. The information indication method of claim 1, wherein the RSS configuration indication is used for indicating whether RSS configuration information of all neighboring cells is the same as the RSS configuration information of the serving cell.

3. The information indication method of claim 1, further comprising:

sending second information to the terminal in a case where the RSS configuration information of the neighboring cell is different from the RSS configuration information of the serving cell.

4. The information indication method of claim 3, wherein the second information comprises:

a frequency domain candidate position indication, which is used for indicating a position of an RSS of the neighboring cell in a frequency domain candidate position.

5. The information indication method of claim 3, wherein the second information comprises at least one of:

a time domain candidate position indication, which is used for indicating a position of an RSS of the neighboring cell in a plurality of RSS time domain offset candidate positions;

a relative time domain offset, which is used for indicating a position of an RSS of the neighboring cell in an RSS time domain offset interval; or an indication for a position within a group, which is used for indicating a position of an RSS of the neighboring cell in a time domain offset group, and an RSS time domain offset of the serving cell and an RSS time domain offset of the neighboring cell are located in a same time domain offset group.

6. The information indication method of claim 3, wherein the second information comprises an indication of a number of CRS ports, and the indication of the number of CRS ports is used for indicating that a number of CRS ports of the neighboring cell is a relatively high value or a relatively low value of two of a number of candidate ports other than a number of CRS ports of the serving cell.

7. The information indication method of claim 1, wherein the RSS configuration information of the neighboring cell being the same as the RSS configuration information of the serving cell comprises at least one of:

an RSS frequency domain position of the neighboring cell is the same as an RSS frequency domain position of the serving cell;

an RSS time domain offset of the neighboring cell is the same as an RSS time domain offset of the serving cell; or a number of cell-specific reference signal (CRS) ports of the neighboring cell is the same as a number of CRS ports of the serving cell.

8. An information indication method, comprising:

receiving first information from a base station, wherein the first information comprises a re-synchronization signal (RSS) configuration indication, and the RSS configuration indication is used for indicating whether RSS configuration information of a neighboring cell is the same as RSS configuration information of a serving cell; and acquiring the RSS configuration information of the neighboring cell according to the RSS configuration information of the serving cell in a case where the RSS configuration information of the neighboring cell is the same as the RSS configuration information of the serving cell, determining the RSS configuration information of the neighboring cell according to the RSS configuration information of the serving cell in a case where the RSS configuration information of the neighboring cell is different from the RSS configuration information of the serving cell, wherein an RSS time domain offset candidate position comprises H time domain offset groups, each RSS time domain offset group comprises M positions, an RSS time domain offset of the serving cell and an RSS time domain offset of the neighboring cell are located in a same time domain offset group, and H and M are positive integers, wherein determining the RSS configuration information of the neighboring cell according to the RSS configuration information of the serving cell comprises:

determining a time domain offset group where the RSS time domain offset of the neighboring cell is located according to the RSS time domain offset of the serving cell; and moduloing a number of time domain offsets in the time domain offset group according to a cell identifier of the neighboring cell to obtain a position within a group of the neighboring cell.

9. The information indication method of claim 8, further comprising:

acquiring the RSS configuration information of the neighboring cell according to second information from the base station in a case where the RSS configuration information of the neighboring cell is different from the RSS configuration information of the serving cell.

10. The information indication method of claim 9, wherein acquiring the RSS configuration information of the neighboring cell according to the second information from the base station comprises:

acquiring an RSS frequency domain position of the neighboring cell from a plurality of RSS frequency domain candidate positions according to a frequency domain candidate position indication comprised in the second information.

11. The information indication method of claim 9, wherein acquiring the RSS configuration information of the neighboring cell according to the second information from the base station comprises at least one of:
acquiring an RSS time domain offset of the neighboring cell from a plurality of RSS time domain offset candidate positions according to a time domain candidate position indication comprised in the second information;
acquiring an RSS time domain offset of the neighboring cell from an RSS time domain offset interval according to a relative time domain offset comprised in the second information; or
acquiring an RSS time domain offset of the neighboring cell from a time domain offset group according to an indication for a position within the group comprised in the second information, wherein an RSS time domain offset of the serving cell and the RSS time domain offset of the neighboring cell are located in a same time domain offset group.

12. The information indication method of claim 9, wherein acquiring the RSS configuration information of the neighboring cell according to the second information from the base station comprises:
acquiring a number of CRS ports of the neighboring cell according to an indication of a number of CRS ports comprised in the second information; wherein the indication of the number of CRSs is used for indicating that the number of CRS ports of the neighboring cell is a relatively high value or a relatively low value of two of a number of candidate ports other than a number of CRS ports of the serving cell.

13. The information indication method of claim 8, further comprising:
acquiring the RSS configuration information of the neighboring cell according to a cell identifier of the neighboring cell in a case where the RSS configuration information of the neighboring cell is different from the RSS configuration information of the serving cell.

14. The information indication method of claim 13, wherein acquiring the RSS configuration information of the neighboring cell according to the cell identifier of the neighboring cell comprises at least one of:
calculating a position within a group according to the cell identifier of the neighboring cell, acquiring an RSS time domain offset of the neighboring cell from a time domain offset group according to the position within the group, wherein an RSS time domain offset of the serving cell and the RSS time domain offset of the neighboring cell are located in a same time domain offset group;
calculating a relative time domain offset according to the cell identifier of the neighboring cell, and acquiring an RSS time domain offset of the neighboring cell from an RSS time domain offset interval according to the relative time domain offset; or
calculating a position within a set of a candidate RSS time domain offset set according to the cell identifier of the neighboring cell, and acquiring an RSS time domain offset of the neighboring cell from the candidate RSS time domain offset set according to the position within the set.

15. A base station, comprising:
a processor and a memory storing processor-executable instructions which, when executed by the processor, are configured to send first information to a terminal, wherein the first information comprises a re-synchronization signal (RSS) configuration indication, the RSS configuration indication is used for indicating whether RSS configuration information of a neighboring cell is the same as RSS configuration information of a serving cell, so that the terminal acquires the RSS configuration information of the neighboring cell according to the RSS configuration information of the serving cell in a case where the RSS configuration information of the neighboring cell is the same as the RSS configuration information of the serving cell,
wherein the processor-executable instructions which, when executed by the processor, are configured to determine the RSS configuration information of the neighboring cell according to the RSS configuration information of the serving cell in a case where the RSS configuration information of the neighboring cell is different from the RSS configuration information of the serving cell,
wherein an RSS time domain offset candidate position comprises H time domain offset groups, each RSS time domain offset group comprises M positions, an RSS time domain offset of the serving cell and an RSS time domain offset of the neighboring cell are located in a same time domain offset group, and H and M are positive integers, wherein to determine the RSS configuration information of the neighboring cell according to the RSS configuration information of the serving cell comprises:
determining a time domain offset group where the RSS time domain offset of the neighboring cell is located according to the RSS time domain offset of the serving cell; and
moduloing a number of time domain offsets in the time domain offset group according to a cell identifier of the neighboring cell to obtain a position within a group of the neighboring cell.

* * * * *